United States Patent
O'Toole et al.

(10) Patent No.: US 7,059,450 B2
(45) Date of Patent: Jun. 13, 2006

(54) AUTOMATIC LUBRICATION SYSTEM

(75) Inventors: Bryan J. O'Toole, Twinsburg, OH (US); Jim Wollbrinck, Lakewood, OH (US); Jeff Conrad, Valley City, OH (US); Raymond J. Niemczura, Sr., Mentor, OH (US); Ryan Helman, Parma, OH (US); Ron Sears, Worthington, OH (US); Tom Deblasis, Pittsburgh, PA (US); Eric Colburn, Wexford, PA (US)

(73) Assignee: Lubriquip, Inc., Cleveland, OH (US)

( * ) Notice: Subject to any disclaimer, the term of this patent is extended or adjusted under 35 U.S.C. 154(b) by 0 days.

(21) Appl. No.: 10/459,018

(22) Filed: Jun. 11, 2003

(65) Prior Publication Data

US 2004/0003969 A1 Jan. 8, 2004

Related U.S. Application Data

(60) Provisional application No. 60/388,202, filed on Jun. 12, 2002, provisional application No. 60/416,351, filed on Oct. 4, 2002.

(51) Int. Cl.
*F01M 1/02* (2006.01)
(52) U.S. Cl. .................................. 184/105.1
(58) Field of Classification Search ................. 184/7.4, 184/26, 27.3, 32, 34, 105.1, 105.2
See application file for complete search history.

(56) References Cited

U.S. PATENT DOCUMENTS

| | | | |
|---|---|---|---|
| 3,659,675 A | 5/1972 | Edelstein et al. | 184/39 |
| 3,739,877 A | 6/1973 | Oliveri | 184/45 |
| 3,939,887 A | 2/1976 | Scarnato | 150/0.5 |
| 4,513,705 A * | 4/1985 | Evans | 123/196 S |
| 4,773,458 A | 9/1988 | Touzani | 150/55 |
| 4,873,100 A | 10/1989 | Dirksing et al. | 426/111 |
| 5,219,040 A * | 6/1993 | Meuer et al. | 184/7.4 |
| 5,273,135 A * | 12/1993 | Havens | 184/6.23 |
| 5,285,871 A * | 2/1994 | Sievenpiper | 184/7.4 |
| 5,423,399 A * | 6/1995 | Smith et al. | 184/5.1 |
| D372,667 S | 8/1996 | Mazda | D9/301 |
| D372,669 S | 8/1996 | Mazda | D9/301 |
| 5,701,855 A * | 12/1997 | Kurihara et al. | 123/73 AD |
| D394,212 S | 5/1998 | Mazda | D9/557 |
| D397,930 S | 9/1998 | Mazda | D9/301 |
| D397,931 S | 9/1998 | Mazda | D9/301 |
| D397,932 S | 9/1998 | Mazda | D9/301 |
| D397,933 S | 9/1998 | Mazda | D9/301 |
| 6,182,793 B1 * | 2/2001 | Jamison | 184/3.2 |
| 6,244,387 B1 | 6/2001 | Paluncic et al. | 184/37 |
| 6,253,877 B1 * | 7/2001 | Yang | 184/6.3 |
| 6,286,624 B1 * | 9/2001 | Bowles | 182/117 |
| 6,354,816 B1 | 3/2002 | Yang | 417/411 |

FOREIGN PATENT DOCUMENTS

GB 2114530 A * 8/1983

* cited by examiner

*Primary Examiner*—Chong H. Kim
(74) *Attorney, Agent, or Firm*—Kusner & Jaffe

(57) ABSTRACT

An automatic lubrication system for a vehicle, comprising a pump assembly having a plurality of outlet ports, a motor operable to drive the pump assembly, and a cartridge that is attachable to the pump assembly to provide a source of lubricant to the pump. The cartridge is removable from the pump assembly and has an interior space that is collapsible as lubricant is dispensed therefrom. A controller is provided to periodically initiate the motor to cause the pump to dispense lubricant to the outlet ports.

21 Claims, 19 Drawing Sheets

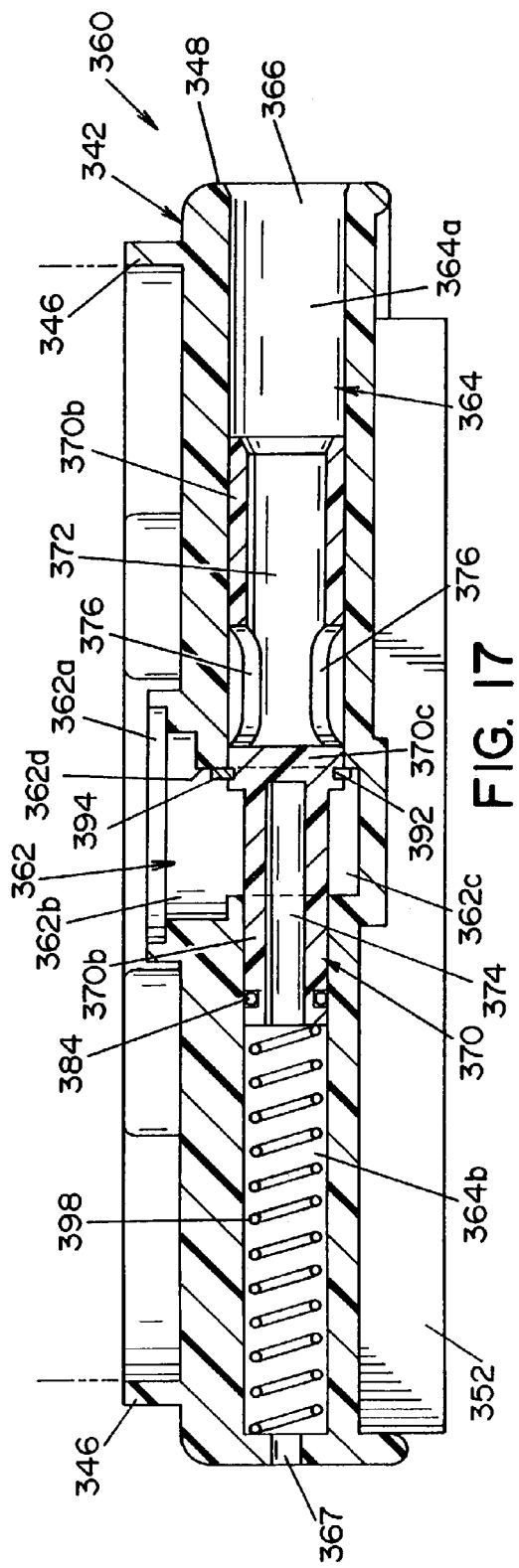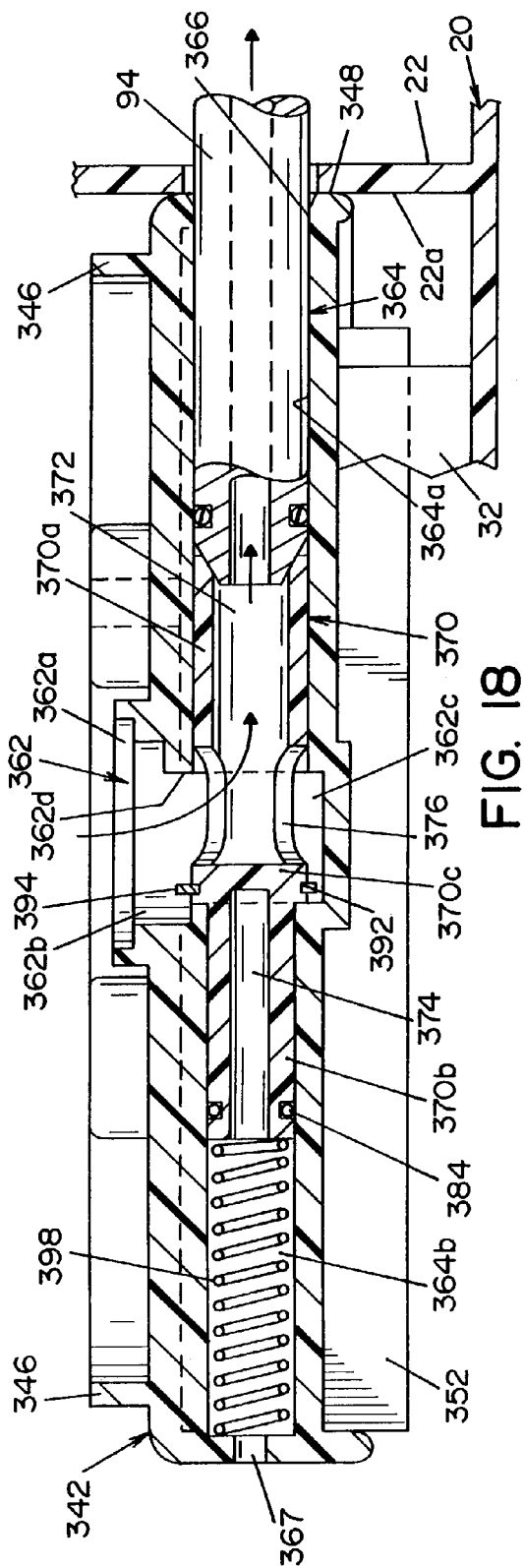

AUTOMATIC LUBRICATION SYSTEM

This application claims the benefit of U.S. Provisional Ser. Nos. 60/388,202 filed Jun. 12, 2002 and 60/16,351 filed Oct. 4, 2002.

FIELD OF THE INVENTION

The present invention relates generally to lubrication systems, and more particularly to an automatic lubrication system for lubricating components of a vehicle.

BACKGROUND OF THE INVENTION

Many organizations and businesses, such as delivery and courier services, utilize fleets of delivery vehicles. These vehicles are often used continuously for extended periods of time. Such use leads to rapid failure of certain components on the vehicles. In some instances, failure of the vehicle components is a result of a lack of lubrication. In this respect, certain parts of an automotive vehicle, such as the suspension and steering components are susceptible to wear if not lubricated. Such wear is increased on fleet vehicles due to the increased use of such vehicles, as compared to a typical non-commercial vehicle. Eventually when the wear becomes extreme, the worn components must be replaced or repaired, resulting in downtime of the vehicle, and the expense to undertake such repairs. Periodic maintenance and lubrication of these components will reduce wear, prolong the life of the components and increase the service life of the vehicle, but, such maintenance typically requires the services of a relatively expensive mechanic and also requires that the vehicle be out-of-service during such maintenance.

The present invention overcomes these and other problems, and provides a vehicle-mounted, automatic lubrication system that periodically lubricates vehicle components.

SUMMARY OF THE INVENTION

In accordance with one embodiment of the present invention, there is provided an automatic lubrication system for a vehicle, comprising a pump assembly having a plurality of outlet ports, a motor operable to drive the pump assembly, and a cartridge that is attachable to the pump assembly to provide a source of lubricant to the pump. The cartridge is removable from the pump assembly and has an interior space that is collapsible as lubricant is dispensed therefrom. A controller is provided to periodically initiate the motor to cause the pump to dispense lubricant to the outlet ports.

In accordance with another embodiment of the present invention, there is provided a lubrication system for a vehicle, comprising a lubrication dispensing assembly having a plurality of outlet ports that are connectible to locations on the vehicle. A controller is provided to periodically activate the lubrication dispensing assembly to dispense metered amounts of lubricant to the outlet ports. A replaceable lubricant cartridge having an interior cavity for storing lubricant under pressure is attachable to the dispensing assembly. The cartridge includes valve means that is operable to allow the flow of lubricant to the dispensing assembly when the cartridge is attached to the dispensing assembly and to prevent the flow of lubricant to the dispensing assembly when the cartridge is detached from the dispensing assembly In accordance with another embodiment of the present invention, there is provided a lubricant cartridge for a lubrication system having a base with a passage therethrough. The passage has a first end and a second end connectable to the lubrication system. A collapsible cartridge having a collapsible inner chamber for storing a lubricant is mountable on the base with the inner chamber in communication with the first end of the passage. A biasing element biases the cartridge toward a collapsed configuration, wherein the lubricant within the inner chamber is forced into the passage.

In accordance with another embodiment of the present invention, there is provided a method of filling or refilling a collapsible lubricant cartridge that is used in a lubrication system. The cartridge has an inner chamber for holding a lubricant and a passage connectable to the inner chamber. The method of filling comprises the steps of: attaching the cartridge in a collapsed configuration to an outlet of a lubricant dispenser, the outlet being connectable to the passage; and injecting a predetermined amount of the lubricant through the passage into the cartridge to cause the cartridge to fill with the lubricant and move the cartridge to a non-collapsed configuration.

In accordance with yet another embodiment of the present invention, there is provided a method of refilling a collapsible lubricant cartridge that is used in a lubrication system. The cartridge has an inner chamber for holding a lubricant and a passage connectable to the inner chamber, and the lubrication system has a lubrication dispensing assembly that has an inlet port in communication with the passage in the cartridge when the cartridge is attached to the dispensing assembly. The method of refilling, comprises the steps of: attaching a lubricant dispenser to the inlet port when the cartridge is in a collapsed or partially collapsed configuration; and injecting the lubricant through the inlet port and through the passage into the cartridge to cause the cartridge to fill with the lubricant and move the cartridge to a non-collapsed configuration.

An advantage of the present invention is a vehicle-mounted, automatic lubrication system.

Another advantage of the present invention is a lubrication system as described above that intermittently provides a lubricant to vehicle components.

Another advantage of the present invention is a lubrication system as described above, wherein a lubrication cycle is based upon the running time of the vehicle.

A still further advantage of the present invention is a replaceable cartridge for a lubrication system as described above.

A still further advantage of the present invention is a cartridge as described above that is reusable.

A still further advantage of the present invention is a method of refilling a replaceable cartridge as described above.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 17 is an enlarged, sectional view showing the flow control assembly in a first position that prevents the flow of lubricant from a cartridge;

FIG. 18 is an enlarged, sectional view showing the flow control assembly in a second position that allows the flow of lubricant from a cartridge.

DETAILED DESCRIPTION OF PREFERRED EMBODIMENT

Figure 1:
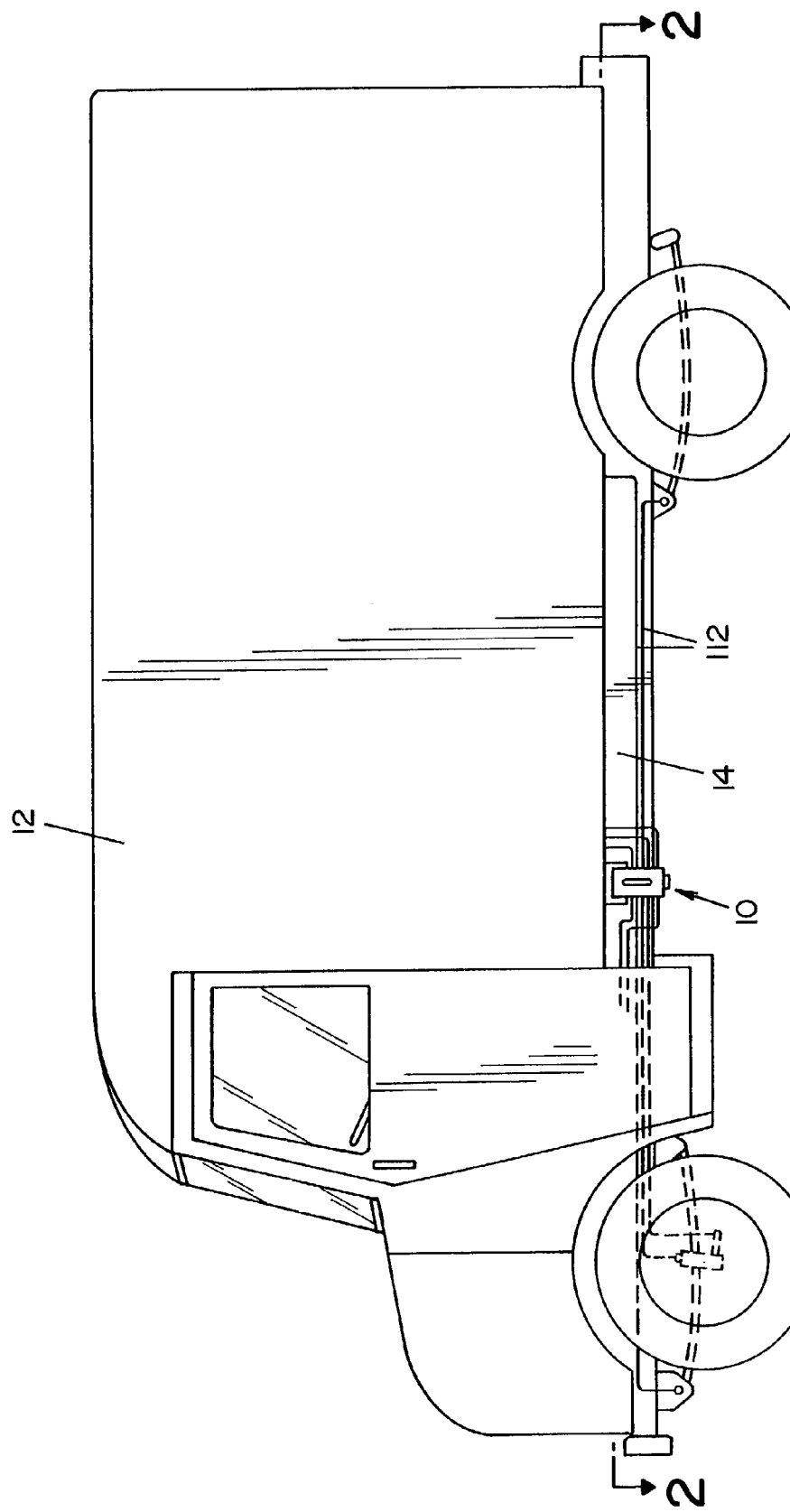
FIG. 1 is a pictorial illustration of an automotive vehicle, showing an automatic lubrication system according to the present invention mounted thereon.
Figure 2:
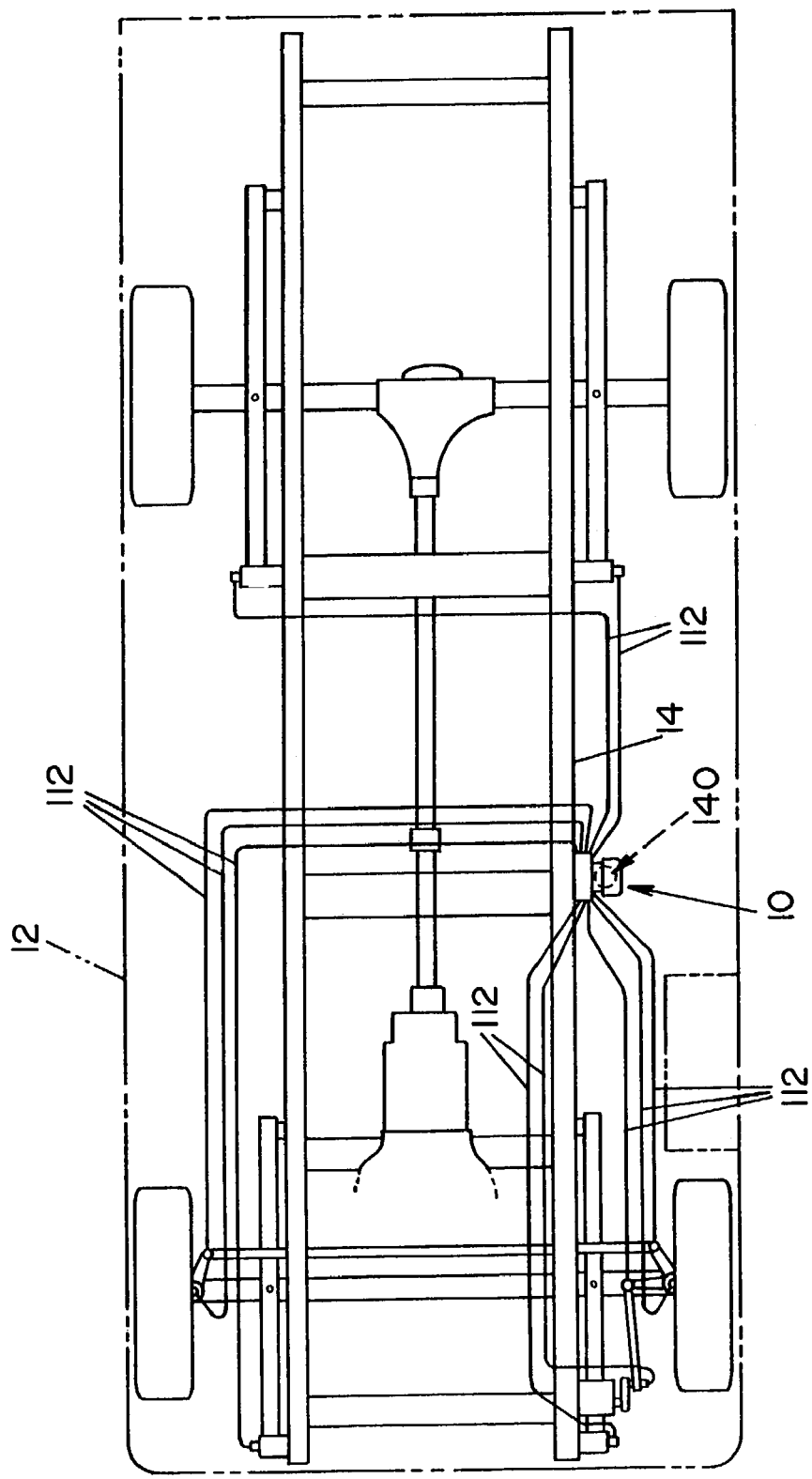
FIG. 2 is a sectional view of the vehicle taken along lines 2—2 of FIG. 1.
Figure 3:
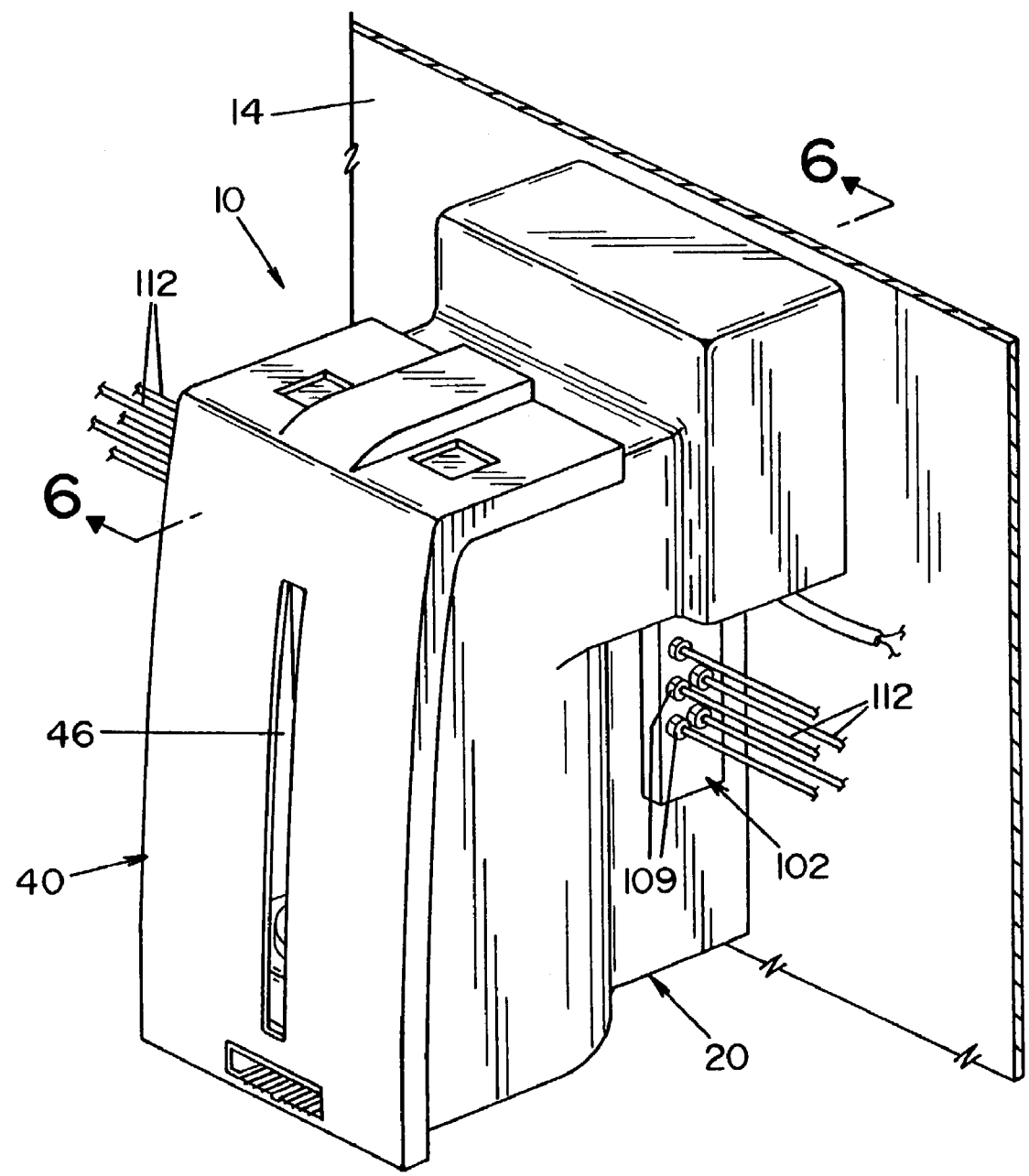
FIG. 3 is a perspective view of the automatic lubrication system shown in FIG. 1.

Referring now to the drawings wherein the showings are for the purpose of illustrating a preferred embodiment of the invention only, and not for the purpose of limiting same, FIG. 1 shows an automatic lubrication system 10 according to the present invention mounted on a vehicle 12. Lubrication system 10 finds advantageous application in dispensing grease, and will be described with particular reference thereto. However, other types of lubricants are also contemplated. In the drawings, vehicle 12 is illustrated as a delivery truck. In this respect, the present invention finds advantageous application for automotive vehicles, such as delivery trucks, and will be described with particular reference thereto. It will of course be appreciated, however, that a lubrication system 10 according to the present invention may also find advantageous application in other types of vehicles, such as boats, aircraft, golf carts and the like, as well as other industrial applications.

Figure 4:
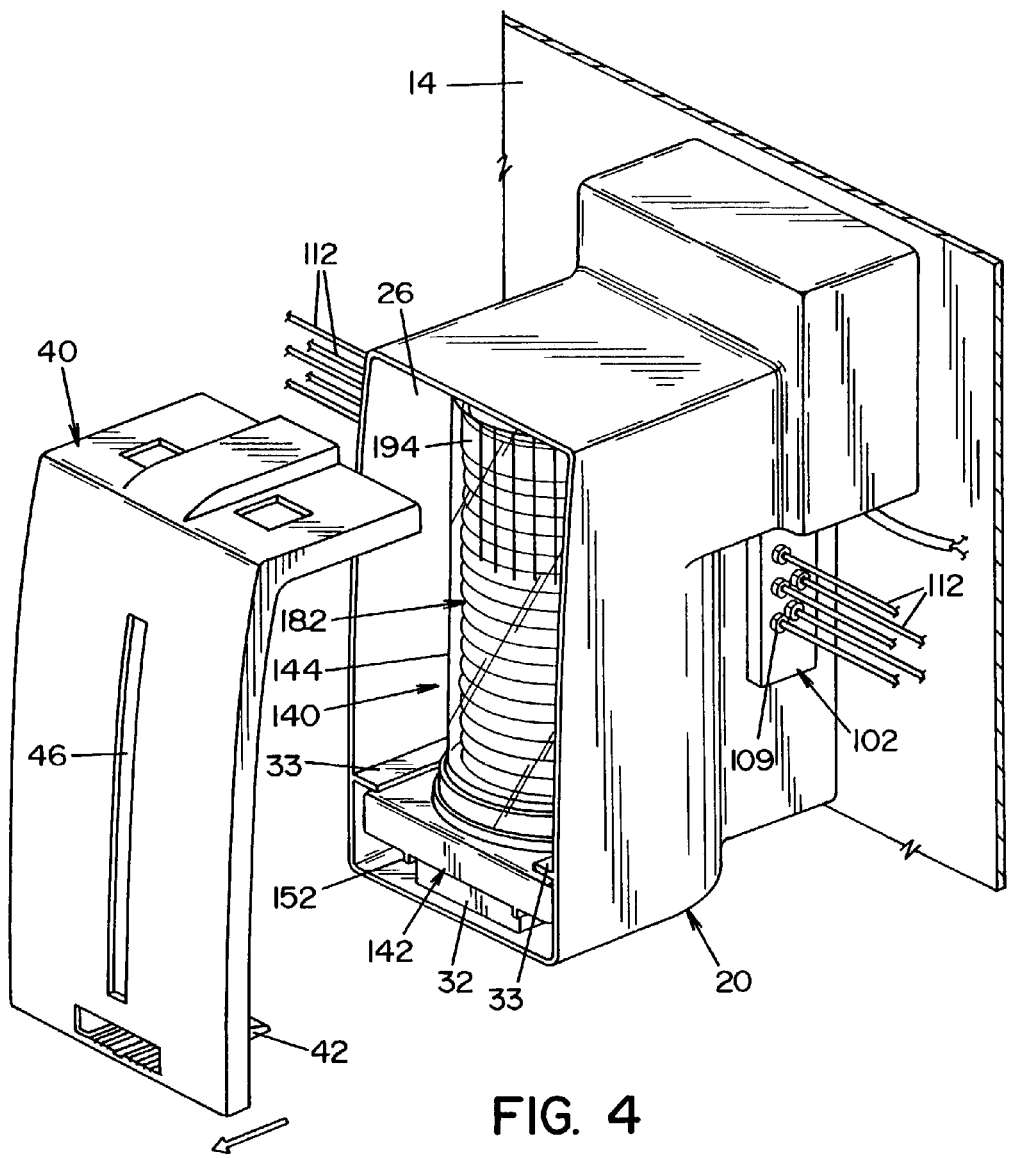
FIG. 4 is an exploded view of the automatic lubrication system shown in FIG. 3, showing a cover removed therefrom.
Figure 5:
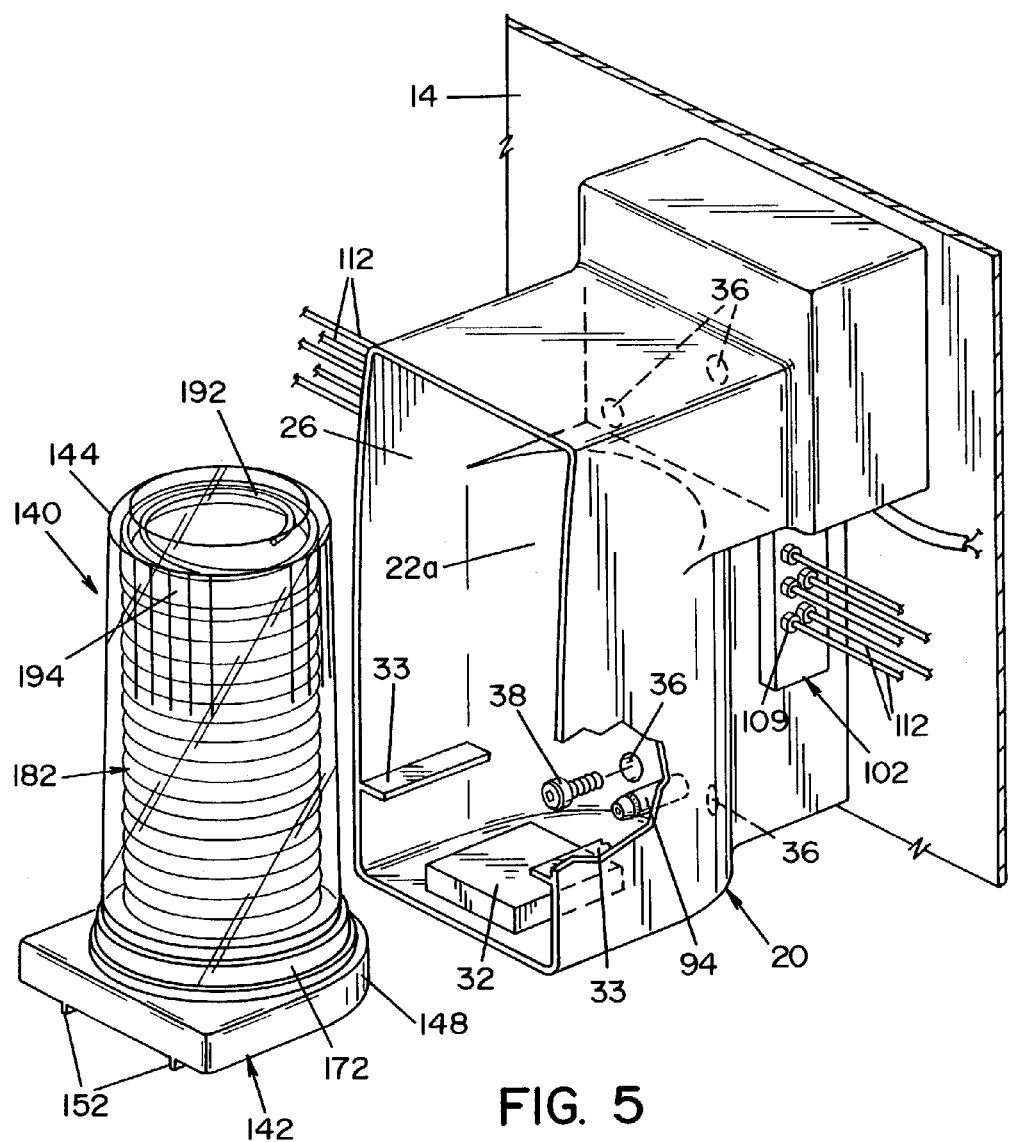
FIG. 5 is an exploded view of the automatic lubrication system shown in FIG. 3 showing a cartridge, according to another aspect of the present invention, removed therefrom.
Figure 6:
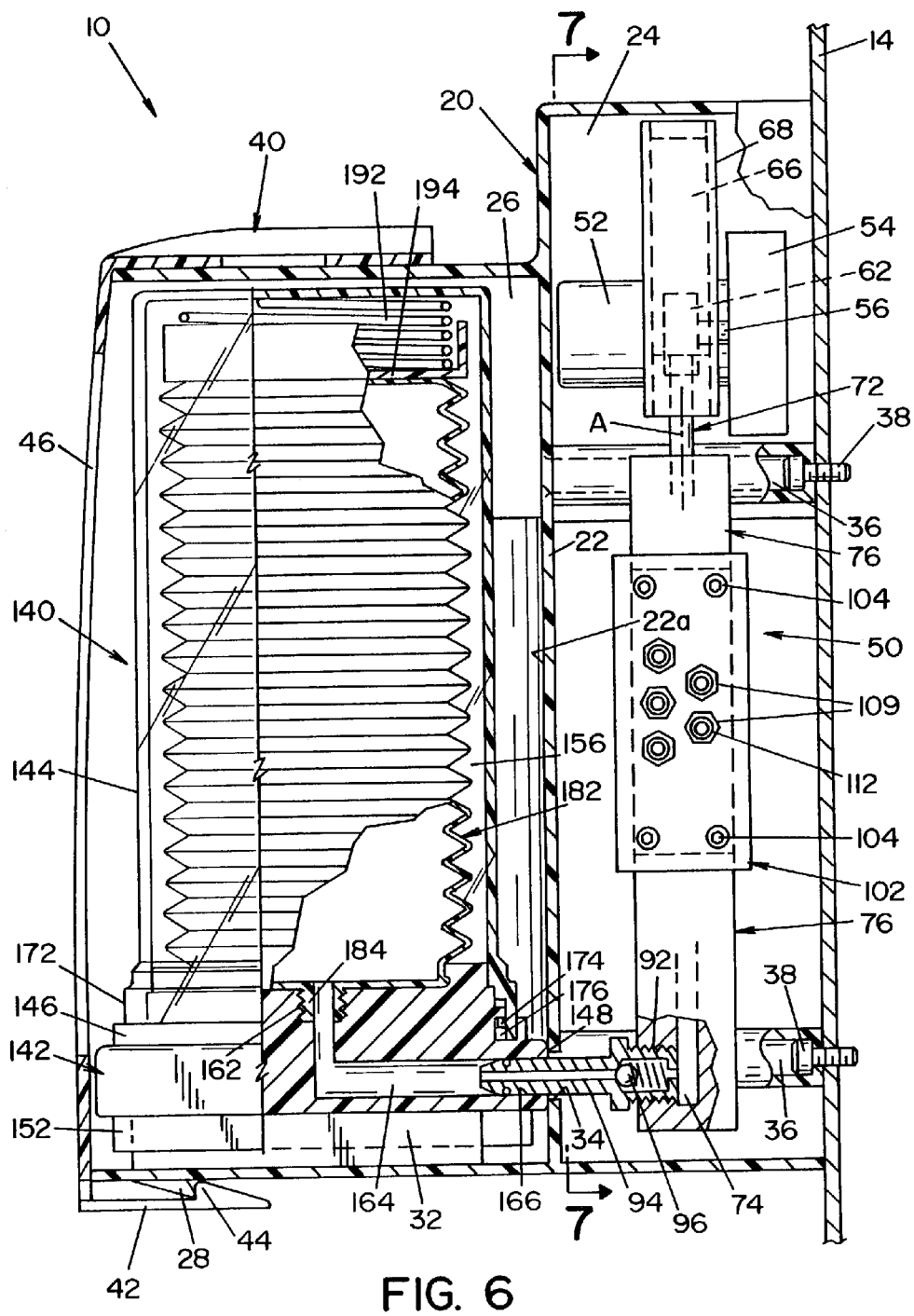
FIG. 6 is a sectional view taken along lines 6—6 of FIG. 3.
Figure 7:
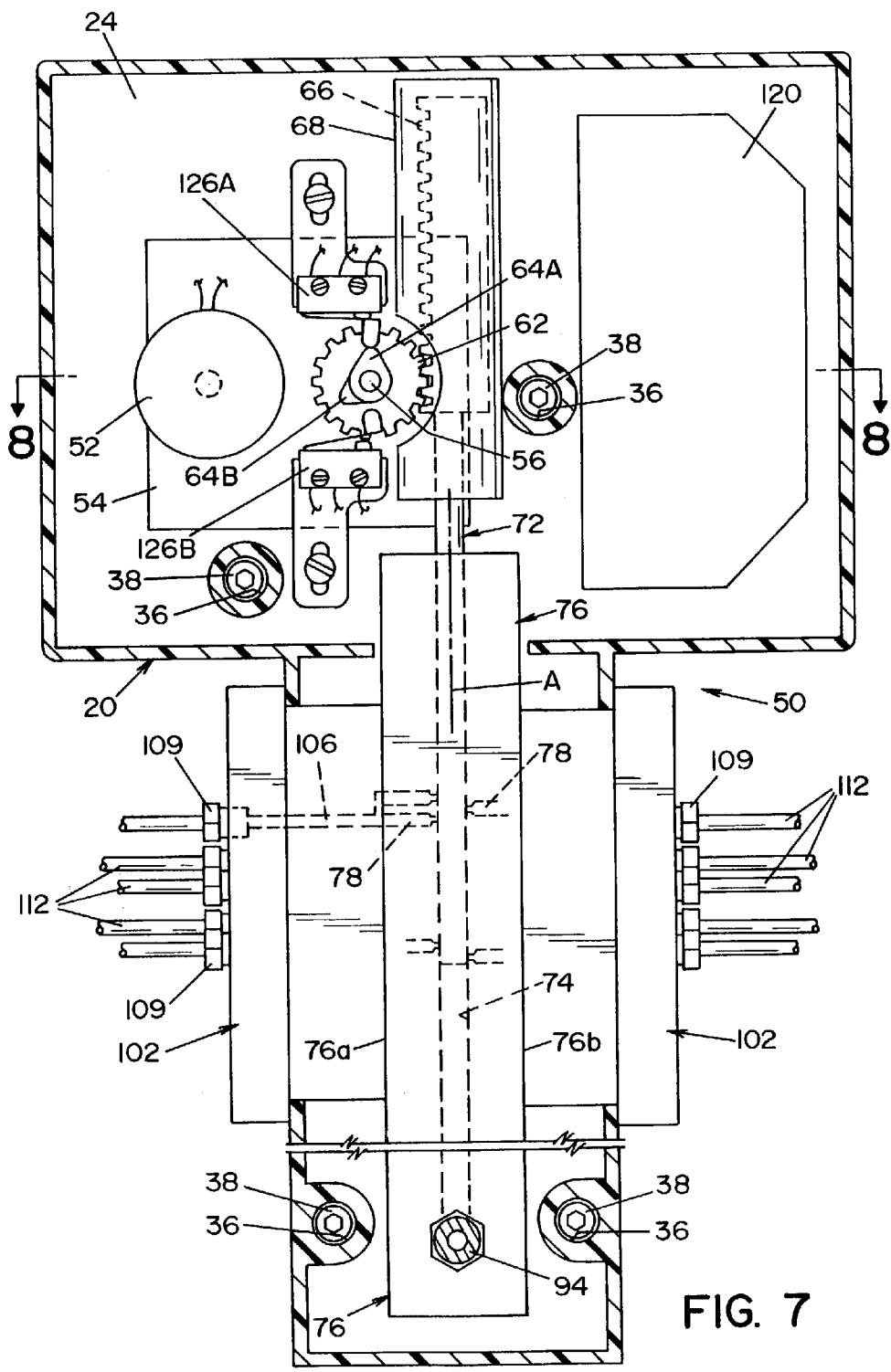
FIG. 7 is a sectional view taken along lines 7—7 of FIG. 6.
Figure 8:
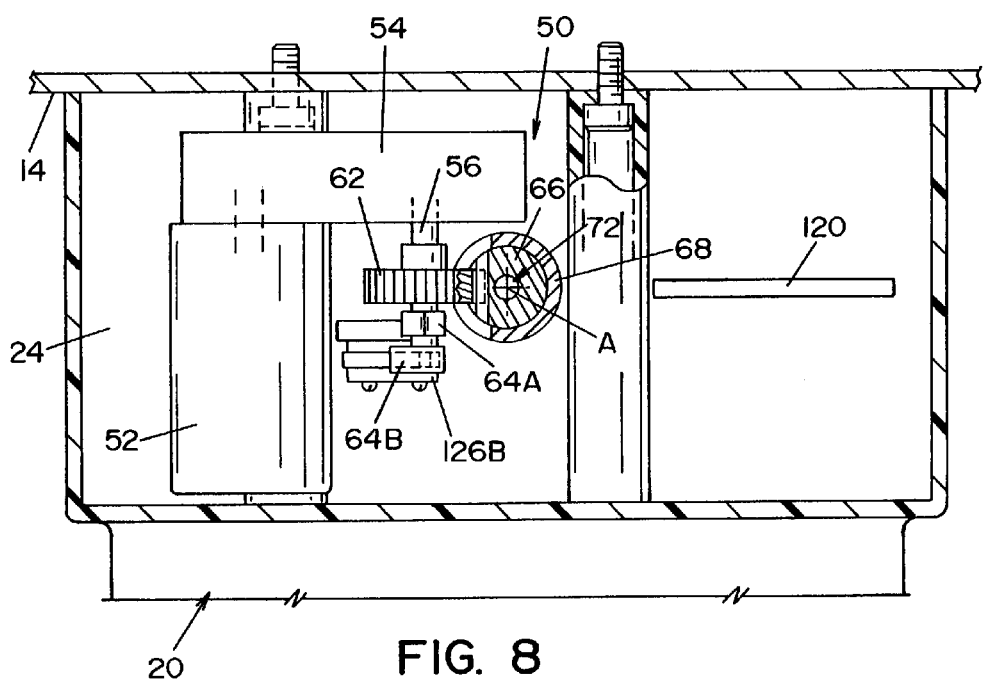
FIG. 8 is a sectional view taken along lines 8—8 of FIG. 7.

Lubrication system 10 is generally comprised of a housing 20 adapted to be mounted onto vehicle 12. Housing 20 is designed to house a pump/dispenser assembly 50, a timer/control system 120 and a replaceable grease cartridge assembly 140. Housing 20 is preferably formed of molded plastic and has an inner wall 22 that basically divides the housing into two cavities 24, 26. Cavity 24 is adapted to house and contain pump/dispenser assembly 50 and timer/control system 120. A plurality of mounting surfaces are provided in cavity 24 for mounting pump/dispenser assembly 50 and timer/control system 120 thereto. In the drawings, such mounting surfaces are not shown to simplify the drawings. Cavity 26 of housing 20 is dimensioned to receive grease cartridge assembly 140. To this end, an inner surface 22a of front cavity 26 has a predetermined, profiled surface that is dimensioned to interact with a matching surface on grease cartridge assembly 140. In the embodiment shown, inner surface 22a is semi-cylindrical in shape, as best illustrated in FIGS. 5 and 6. A track or guide 32 is provided on a lower surface of cavity 26 to interact with guide means on grease cartridge assembly 140, as shall be described in greater detail below. In the embodiment, guide or track 32 is comprised of a generally rectangular pad that extends from profiled surface 22a to the front opened side of front cavity 26. Horizontally extending shelves 33 are provided along the interior sides of housing 20, as best seen in FIGS. 4 and 5. An opening 34 extends through inner wall 22 to communicate front cavity 26 with back cavity 24, as best illustrated in FIG. 6. Housing 20 includes a plurality of mounting recesses 36 that are molded or otherwise formed within housing 20. Mounting recesses 36 are dimensioned to receive fasteners 38, as best seen in FIGS. 5, 6 and 7, that fasten housing 20 to a generally planar surface on vehicle 12.

A cover 40 is dimensioned to enclose cavity 26. Cover 40 is dimensioned to slide over the outer surfaces of housing 20. A resilient arm 42 having a shoulder portion 44 thereon is dimensioned to lock cover 40 onto housing 20 by engaging a tab 28 extending from the lower surface of housing 20, as best seen in FIG. 6. A slot 46 is formed in cover 40 to allow viewing of grease cartridge assembly 140.

Referring now to FIGS. 6–11, pump/dispenser assembly 50 is shown. Pump/dispenser assembly 50 is generally comprised of a motor 52 that is connected to a gear reduction assembly 54. Gear reduction assembly 54 is operable to increase torque, reduce the rotational speed of the output of motor 52 and increase pump force. The actual components forming gear reduction assembly 54 are not shown in detail for the ease of illustration. A drive shaft 56 extends from gear reduction assembly 54. A pinion gear 62 is mounted on drive shaft 56 of gear reduction assembly 54 for rotation therewith. Also mounted on drive shaft 56 are two cam elements 64A, 64B. Cam elements 64A, 64B are angularly spaced from one another. Motor 52 and gear reduction assembly 54 are mounted to mounting surfaces (not shown) on housing 20. Pinion gear 62 operatively engages a rack gear 66 that is moveable along an axis "A" within a cylindrical guide sleeve 68. In this respect, in the embodiment shown, rack gear 66 is basically a cylindrical bar having a rack gear formed along a surface thereof.

Rack gear 66 is connected at one end to a pump piston 72. Pump piston 72 is moveable within a cylindrical cavity 74 in pump body 76. In the embodiment shown, pump body 76 is rectangular in shape and has sixteen (16) pump ports 78, that extend from cavity 74 to the outer surfaces of pump body 76. In the embodiment shown, eight (8) ports 78 extend to one surface 76a of pump body 76 and eight (8) ports extend to another surface 76b of pump body 76.

An axially-aligned, central passage 82 extends from the lower end of pump piston 72 through a portion thereof. A directional check valve 84 is disposed in passage 82. Lateral passageways 82a extend from central passage 82 to an annular groove 86 formed on the surface of pump piston 72.

Pump body 76 also includes an inlet port 92 that extends from the outer surface of pump body 76 into pump cavity 74. Inlet port 92 is threaded to receive an outwardly projecting male fitting 94. Male fitting 94 is dimensioned to extend through opening 34 in wall 22 into cavity 26, when pump/dispensing assembly 50 is mounted to housing 20, as best seen in FIG. 6. Fitting 94 is adapted to connect to grease cartridge assembly 140 (as shall be described in greater detail below) to provide a source of grease to pump cavity 74. Male fitting 94 includes a directional check valve 96.

Manifold blocks 102 are mounted on opposite sides of pump body 76 by conventional fasteners 104. Each manifold block 102 includes a plurality of manifold ports 106, each of which communicates with at least one pump port 78 in pump body 76. In this respect, manifold blocks 102 may be formed with recessed chambers 108 that communicate with two or more pump ports 78, as best seen in FIGS. 9A–9D. Tube fittings 109 are attached to manifold ports 106 for connection with distribution lines 112, i.e., tubing, that connect manifold ports 106 to locations on vehicle 12 where lubrication is needed. In this respect, lubrication distribution lines 112 communicate with grease fittings (not shown) on automotive vehicle 12, as is conventionally known.

Figure 14:
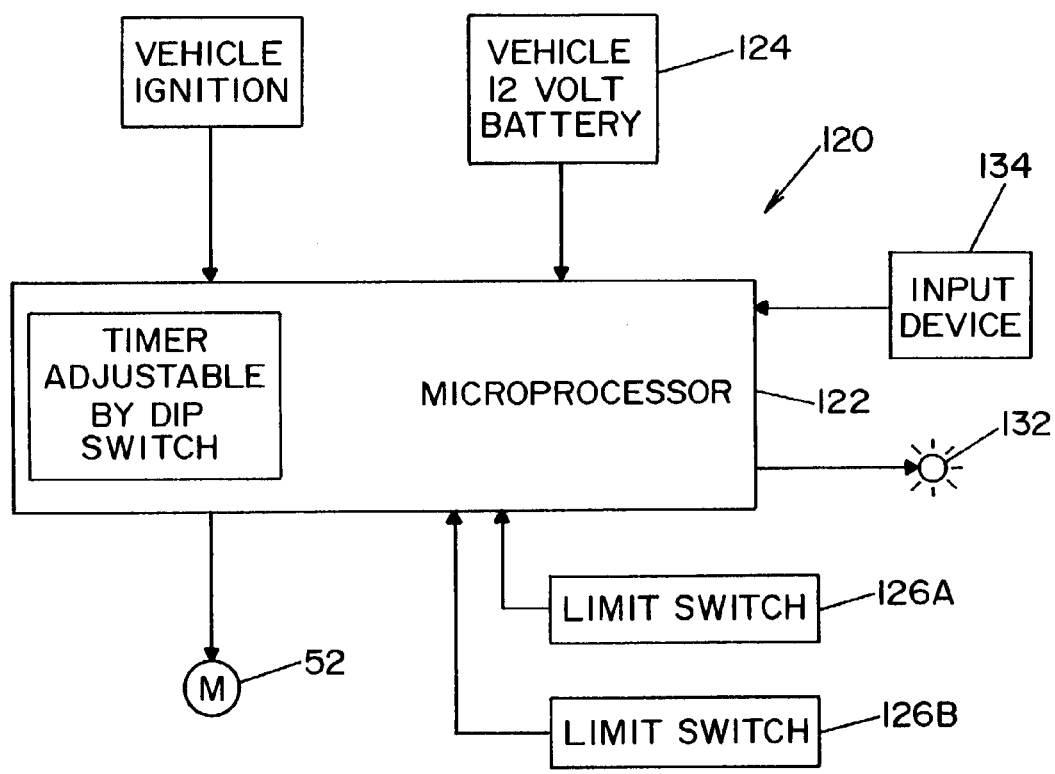
FIG. 14 is a schematic representation of a control system for an automatic lubrication system according to the present invention.

Referring now to FIG. 14, a timer/control system 120 for controlling the operation of automatic grease lubrication system 10 is schematically illustrated. Control circuit 120 includes a microprocessor 122 that is preferably powered by the vehicle's battery, which is designated 124 in the drawing. Electrical switches 126A, 126B are positioned adjacent gear reduction drive shaft 56 to interact with cams 64A, 64B mounted thereon. In conjunction with cams 64A, 64B, switches 126A, 126B provide an indication of the relative position of pump piston 72 in pump body 76, as shall be described in greater detail below. In this respect, switches 126A, 126B provide input signals to microprocessor 122 when activated by cams 64A, 64B. Microprocessor 122 also monitors the vehicle's operation, such as by monitoring the vehicle's ignition system or some other indicia of the vehicle's operation. Microprocessor 122 controls the operation of motor 52 and the direction and rotation thereof Microprocessor 122 is also connected to an indicator 132, such as an LED, that provides an indication of the pump operation. An input device, such as a switch or keyboard 134, is attached to microprocessor 122 to provide an input control signal to microprocessor 122, as shall be described in greater detail below.

Figure 12:
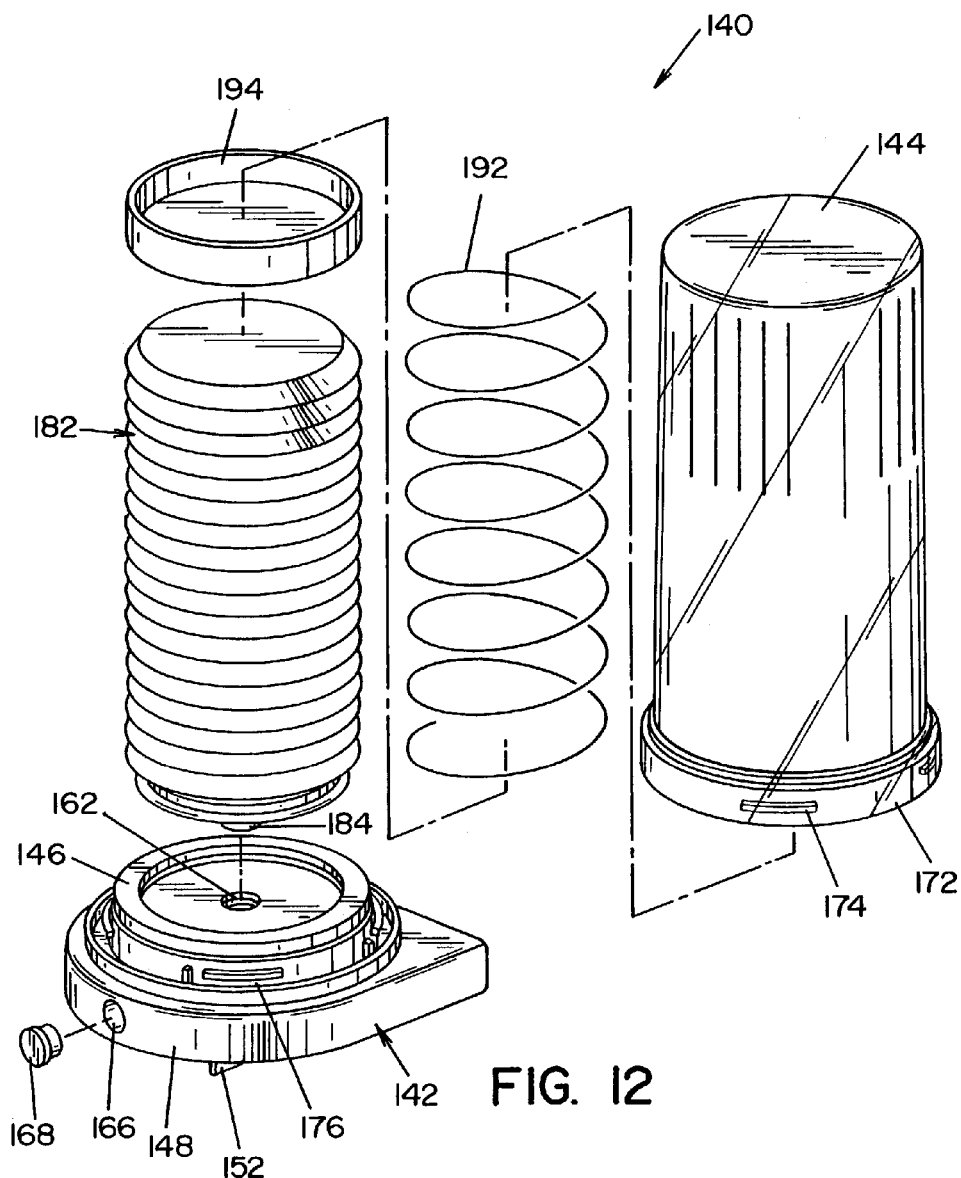
FIG. 12 is an exploded view of a cartridge.

Referring now to FIGS. 6 and 12, grease cartridge assembly 140 is best seen. Grease cartridge assembly 140 is comprised of a base 142 and a generally cup-shaped cover or cap 144. Base 142 is basically a flat, planar component having a cylindrical boss 146 on the upper surface thereof. An edge surface 148 of base 142 has a predetermined profile that is dimensioned to mate with inner surface 22a of cavity 26 of housing 20. In the embodiment shown, edge surface 148 of base 142 has a semi-cylindrical surface for butting and mating engagement with semi-cylindrical surface 22a of cavity 26 of housing 20. The lower surface of base 142 includes guide means to operatively interact with track 32 on housing 20 to guide and to position laterally grease cartridge assembly 140 within cavity 26 of housing 20. In the embodiment shown, spaced apart, parallel rails 152 extend from the bottom of base 142 and are provided to run along the sides of the track or guide 32 within cavity 26 of housing 20. A threaded cylindrical bore 162 is formed within the surface of boss 146. Bore 162 communicates with a passage 164 that extends through base 142 and defines a port 166 along edge surface 148, as best seen in FIG. 6. Port 166 is dimensioned to matingly engage male fitting 94 on pump body 76. A plug 168 is provided to be inserted within port 166 when grease cartridge assembly 140 is not in use in housing 20.

In the embodiment shown, cap 144 is substantially cylindrical in shape and has an open end and a closed end. The open end of cap 144 includes an annular collar 172 having means to operatively engage boss 146 on base 142 to facilitate attachment of cap 144 to base 142. In the embodiment shown, collar portion 172 of cap 144 includes inwardly projecting tabs 174, located along the inner surface thereof, which tabs 174 are dimensioned to be received in slots 176 formed on boss 146 in a manner wherein cap 144 locks onto boss 146 of base 142 when cap 144 is placed on base 142 and is angularly rotated relative thereto. When cap 144 is attached to base 142, a generally cylindrical cavity 156 is defined therebetween. Cavity 156 is dimensioned to receive a collapsible grease cartridge 182. In the embodiment shown, grease cartridge 182 is a generally cylindrical, collapsible bellows cartridge formed of a tough, resilient, polymer material. Grease cartridge 182 has a cylindrical threaded nipple 184 at one end thereof Nipple 184 is dimensioned to be screwed into bore 162 in boss 146, as best seen in FIG. 6. A biasing element 192 is provided to exert a constant, collapsing pressure on grease cartridge 182. Biasing element 192 is comprised of a helical spring. A press plate 194 is disposed between the closed end of cap 144 and the upper end of grease cartridge 182.

Referring now to the operation of lubrication system 10, housing 20, containing pump/dispenser assembly 50, timer/control system 120 and grease cartridge assembly 140, is mounted to a flat surface 14 on vehicle 12 by means of conventional fasteners extending through mounting recesses 36. A grease cartridge assembly 140, full of grease, is within front cavity 26 of housing 20. Guide rail 152 on base 142 interact with track 32 on housing 20 to locate laterally grease cartridge assembly 140 within housing 20. Horizontal shelves 33 are disposed on housing 20 to slide across the upper surface of base 142, to maintain grease cartridge assembly 140 in a proper vertical position within housing 20. Guide rail 152 and track 32 align port 166 in base 142 with male fitting 94 extending from pump body 76, as best seen in FIG. 6. Semi-cylindrical edge surface 148 of base 142 abuts semi-cylindrical surface 22a of housing 20 to insure proper positioning aligning of male fitting 94 within port 166. With grease cartridge assembly 140 in place, cover 40 is applied to housing 20. Cover 40 locks onto housing 20 as shoulder 44 of arm 42 on the bottom of cover 40 locks onto tab 28 on housing 20. As seen in FIG. 6, when properly attached to housing 20, the inner surface of cover 40 engages an edge of base 142 to maintain grease cartridge assembly 140 in position within housing 20.

In the position shown in FIG. 6, grease within grease cartridge 182 communicates through the passageway in male fitting 94 with pump cavity 74 in pump body 76, as best illustrated in FIGS. 9A–9D. Biasing element 192 exerts a constant pressure on grease cartridge 182. In this respect, biasing element 192 is dimensioned to exert a constant force sufficient to collapse grease cartridge 182 and squeeze the grease therefrom at a relatively slow rate. In this respect, the viscosity of the grease is such that the grease is dispensed at a slow rate from grease cartridge 182 under the influence of biasing element 192.

Figure 9A:
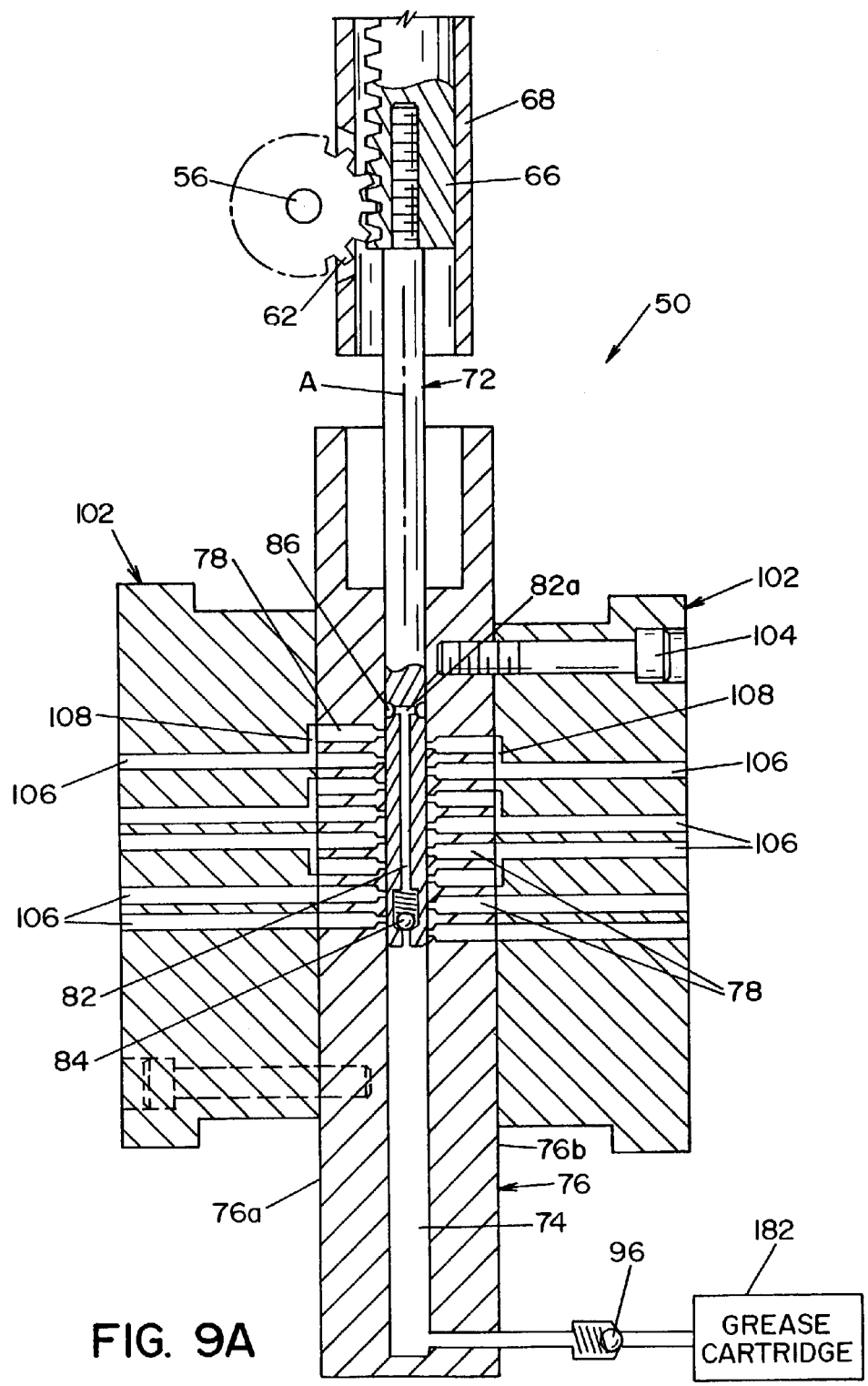
FIGS. 9A–9D are sectional views of a pump assembly illustrating the operation thereof.

Pump/dispenser assembly 50 has an initial position, as illustrated in FIG. 9A, wherein annular groove 86 on pump piston 72 is disposed above the first pump port 78, as shown in FIG. 9A.

According to the present invention, microprocessor 122 monitors the operating time of vehicle 12. In this respect, microprocessor 122 may include an internal clock that is programmed to monitor operating time of the vehicle. Once the vehicle has been operated for a predetermined period of time, such as by example and not limitation, 6 hours, a lubrication cycle would begin. The predetermined period of time would be an accumulated operating time of the vehicle. As indicated above, a microprocessor 122 can be programmed to use a programmable or settable clock to monitor and accumulate time and initiate the lubrication cycle upon the accumulation of the desired time period. Ultimately, a programmable clock having resettable pins may be used to accomplish the same task.

Figure 9B:
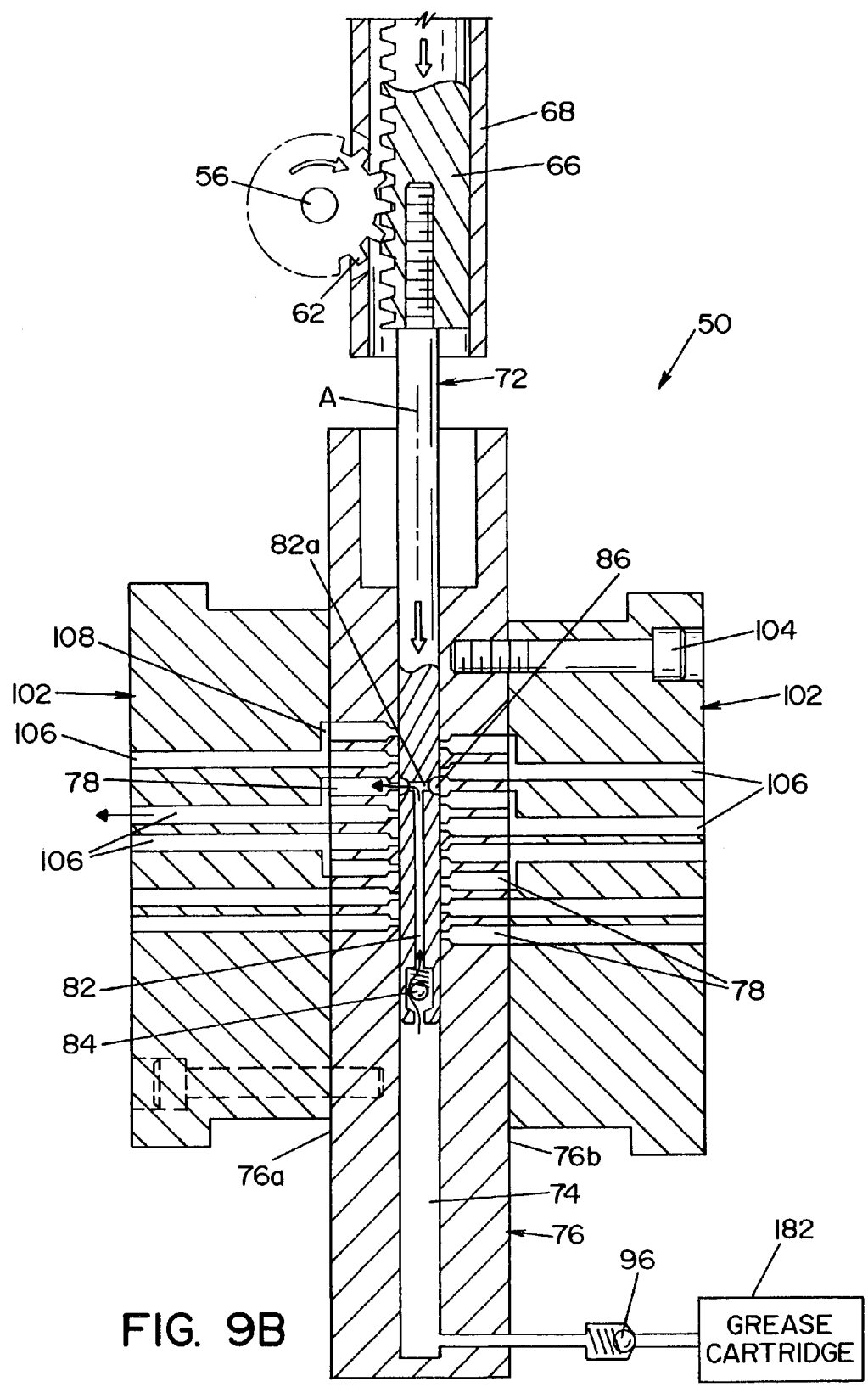

Once the predetermined period of time has been reached, microprocessor 122 will energize motor 52 to cause rotation of pinion gear 62 in a direction, wherein rack gear 66 will cause pump piston 72 to move downward into pump body 76. Microprocessor 122 also energizes indicator 132, to provide an indication that a lubrication cycle is in progress. Gear reduction assembly 54 operates to cause pinion gear 62 to rotate at a desired amount thereby causing downward movement of pump piston 72 at a desired rate. Downward movement of pump piston 72 into pump body 76 causes an increase in pressure within pump body 76. Check valve 96 disposed between pump cavity 74 and grease cartridge 182, prevents a build-up of pressure in grease cartridge 182. The downward movement of pump piston 72 will increase pressure within pump cavity 74 of pump body 76 until such pressure is sufficient to overcome check valve 84 within passage 82 in pump piston 72, wherein grease is forced up through passage 82 in pump piston 72 and through branch passageways 82a to annular groove 86. As pump piston 72 moves downward into pump cavity 74, a metered amount of grease is forced into each pump port 78. Such grease is then conveyed into manifold ports 106 and ultimately through distribution lines 112 to the respective locations on vehicle 12. In this respect, grease existing within the pump ports 78, manifold ports 106 and distribution lines 112 is pushed forward by the new addition of grease being forced therein. As illustrated in FIGS. 9A–9D, manifold ports 106 may be designed such that one or more pump body ports 78 communicates with a single manifold outlet port 106. In this respect, such metered amounts of grease are injected into each pump port 78. Those manifold ports 106 that are connected to two pump ports 78 receive two metered amounts of grease which are directed to a single manifold port 106, and then to a distribution line to provide twice the amount of grease to a specific lubrication point. FIG. 9B illustrates how grease is forced from pump cavity 74 through passage 82 in pump piston 72, through a pump port 78, to a manifold port 106 and to distribution lines 112.

Figure 9C:
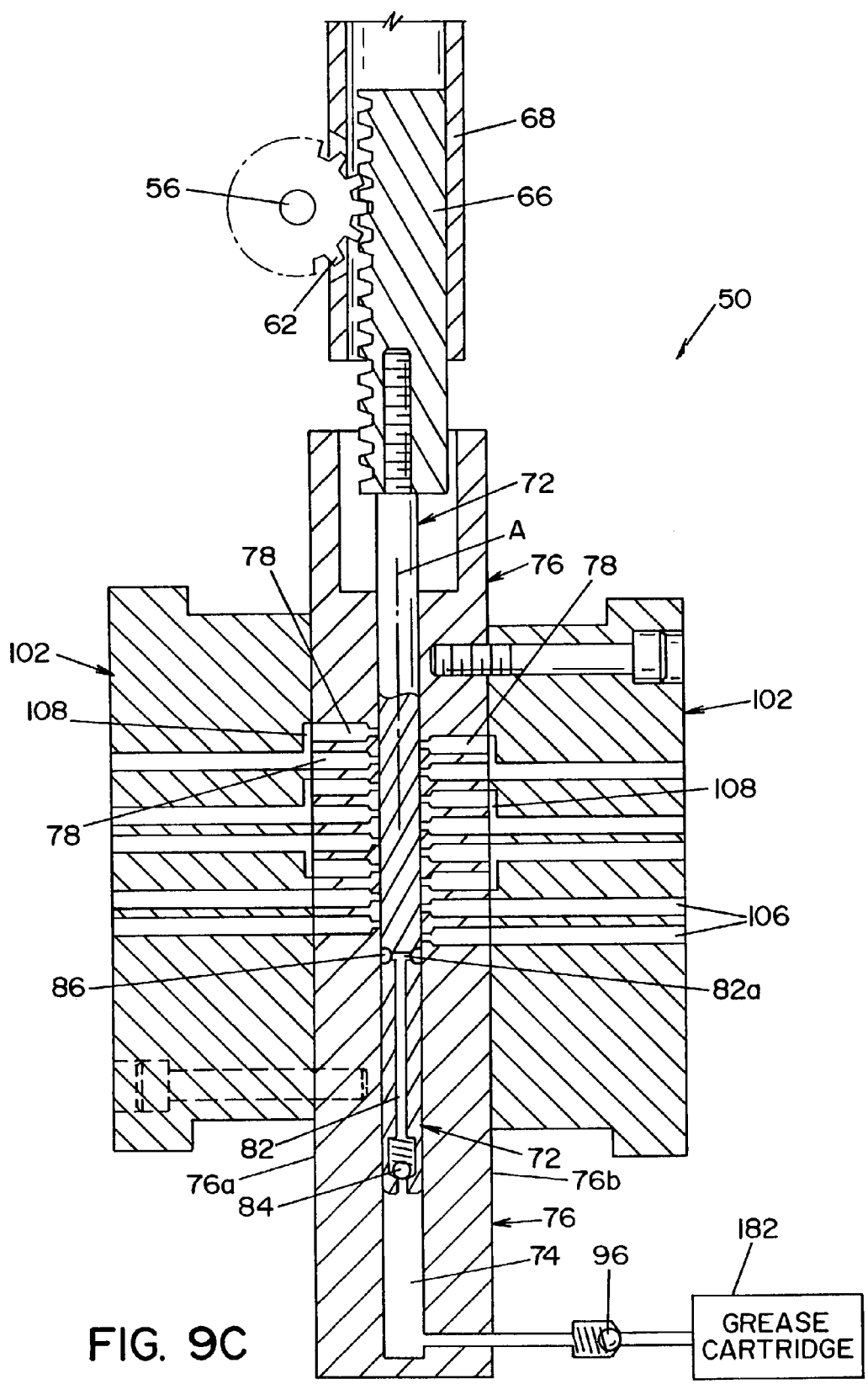
Figure 9D:
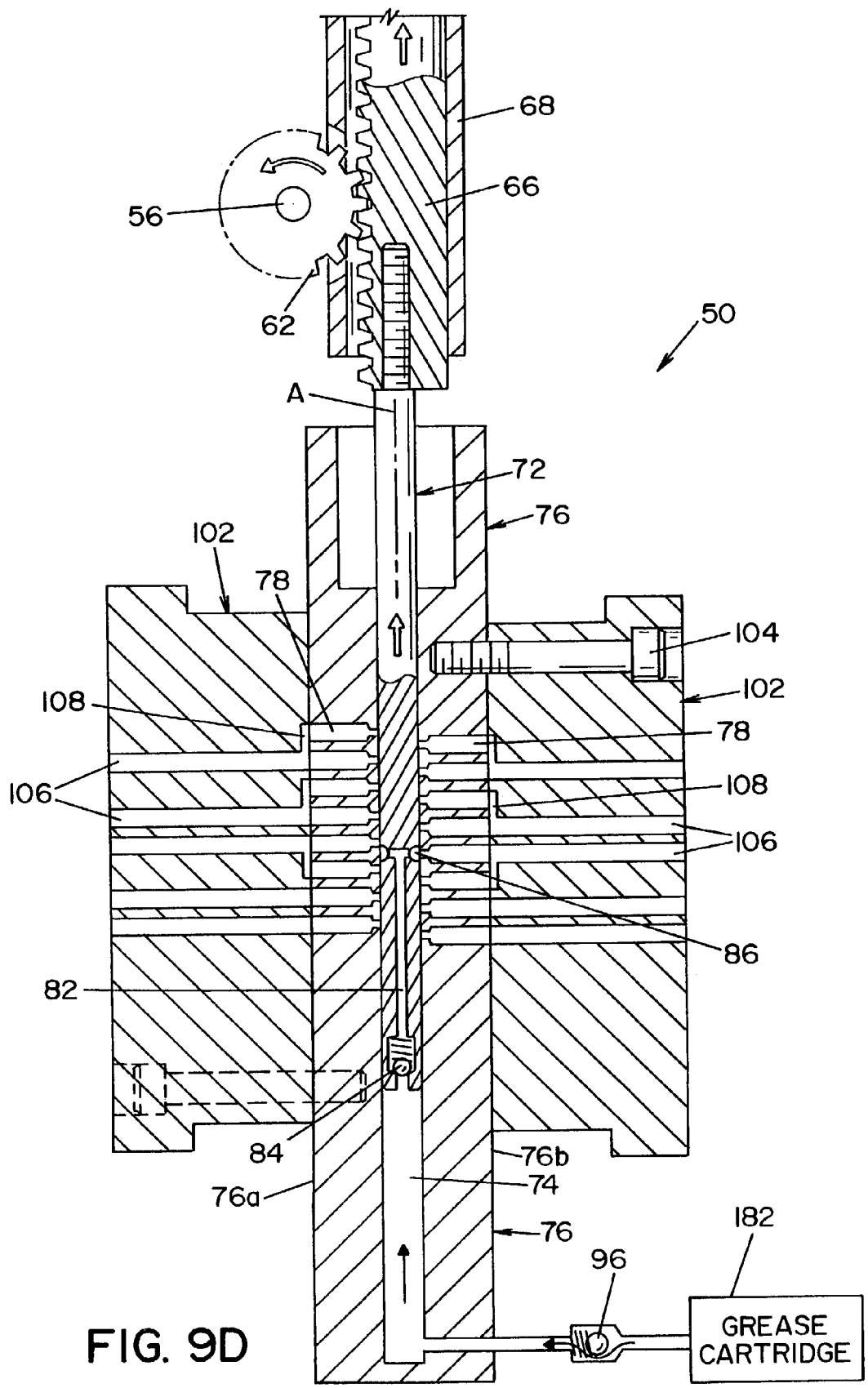

As pump piston 72 continually moves downward through pump body 76, it continues to meter predetermined amounts of grease to each pump port 78, which in turn, communicates with a manifold port 106. Eventually, pump piston 72 reaches a position where annular groove 86 is below the lowest pump port 78, as best seen in FIG. 9C. Cam 64B on drive shaft 56 is located to activate electrical switch 126B when this position has been reached. When actuated, electrical switch 126B sends an electrical signal to microprocessor 122 which causes rotation of motor 52 in a grease pumping direction to cease. Thereafter, microprocessor 122 causes pump motor 52 to rotate in an opposite direction, wherein pinion gear 62 is caused to rotate in a direction wherein rack gear 66 moves upward drawing pump piston 72 upward. The movement of pump piston 72 upward produces a vacuum within pump cavity 74. With the pressure within pump cavity 74 being less than the pressure in grease cartridge 182, check valve 96 opens and grease is sucked into pump cavity 74 as pump piston 72 retracts upward towards its original position. Pump piston 72 eventually reaches its original starting position, as shown in FIG. 9A. Cam 64A on drive shaft 56 is positioned to actuate switch 126A when this position is reached. When switch 126A is actuated, a signal is sent to microprocessor 122 which causes operation of motor 52 to cease, thereby stopping movement of pump piston 72 in the position shown in FIG. 9A, wherein pump/dispenser assembly 50 is ready for another grease dispensing cycle.

Figure 10:
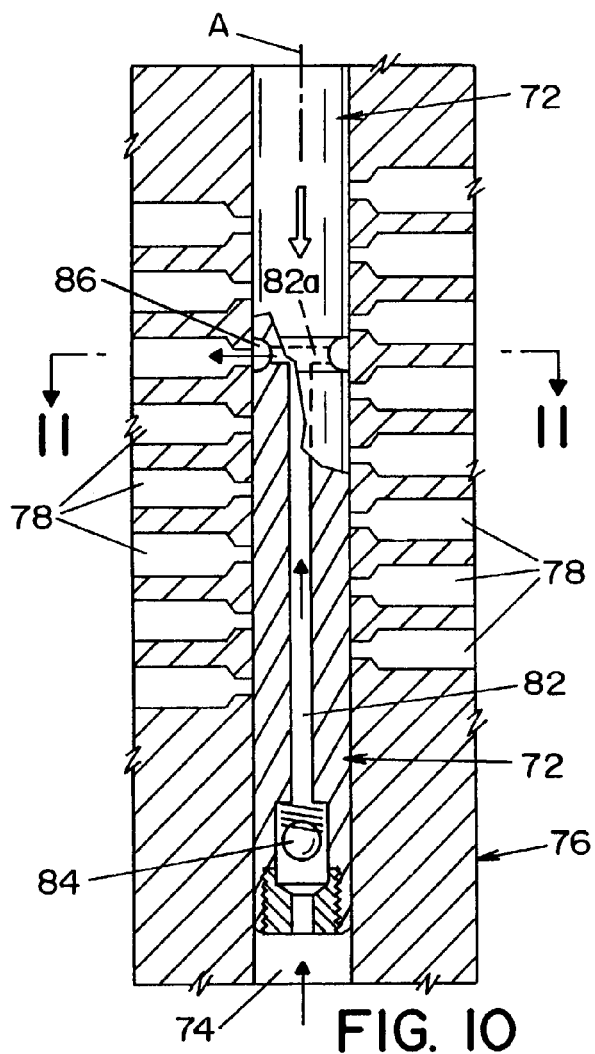
FIG. 10 is an enlarged view of the pump shown in FIGS. 9A–9D.
Figure 11:
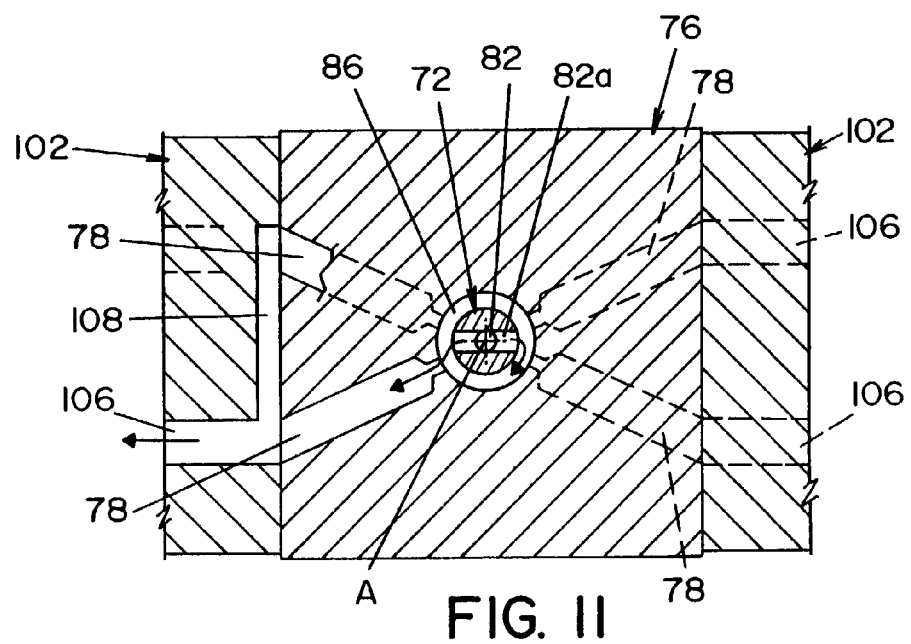
FIG. 11 is a sectional view taken along lines 11—11 of FIG. 10.

The movement of grease through pump piston 72 to annular groove 86 and to pump port 78 is best illustrated in FIG. 10. FIG. 11 is a sectional view taken along lines 11—11 of FIG. 10 illustrating how adjacent ports 78 on one side of pump body 76 are oriented at angles relative to each other to provide more spacing between ports 78 on the surface of pump body 76 so as to provide spacing on each manifold 102 for attachment of fittings and connections.

The operation of lubrication system 10 discussed heretofore disclosed a programmed, "automatic" lubrication cycle initiated after a pre-programmed interval of time. Microprocessor 122 is also preferably programmed to initiate a "manual" lubrication cycle when a signal is received from input device 134. In other words, a lubrication cycle may be initiated by a vehicle operator at anytime using input device 134.

At the completion of either an automatic lubrication cycle or a manual lubrication cycle, microprocessor 122 begins a new timing interval and returns to an automatic lubrication sequence wherein another lubrication cycle will begin after the programmed vehicle-operating time interval is reached.

The present invention thus provides an automatic grease lubrication system 10 that periodically dispenses metered amounts of grease to locations on vehicle 12. As indicated above, certain locations can be provided with multiple amounts of grease based upon the design of manifold blocks 102 attached to pump body 76.

Moreover, the present invention also provides a convenient way to replace grease cartridge 182 by using a replaceable grease cartridge assembly 140. It is also contemplated that grease bellows 182 could be sold alone for assembly into grease cartridge assembly 140.

Figure 13A:
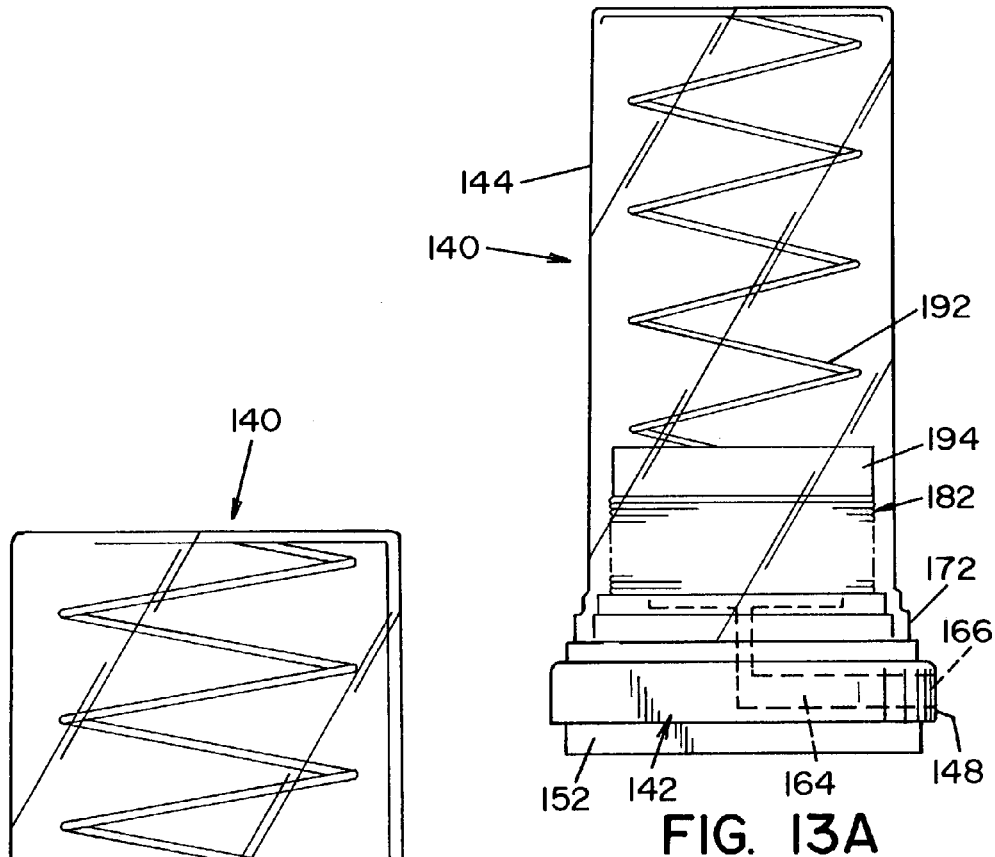
FIGS. 13A and 13B are schematic representations of a system for refilling a cartridge.
Figure 13B:
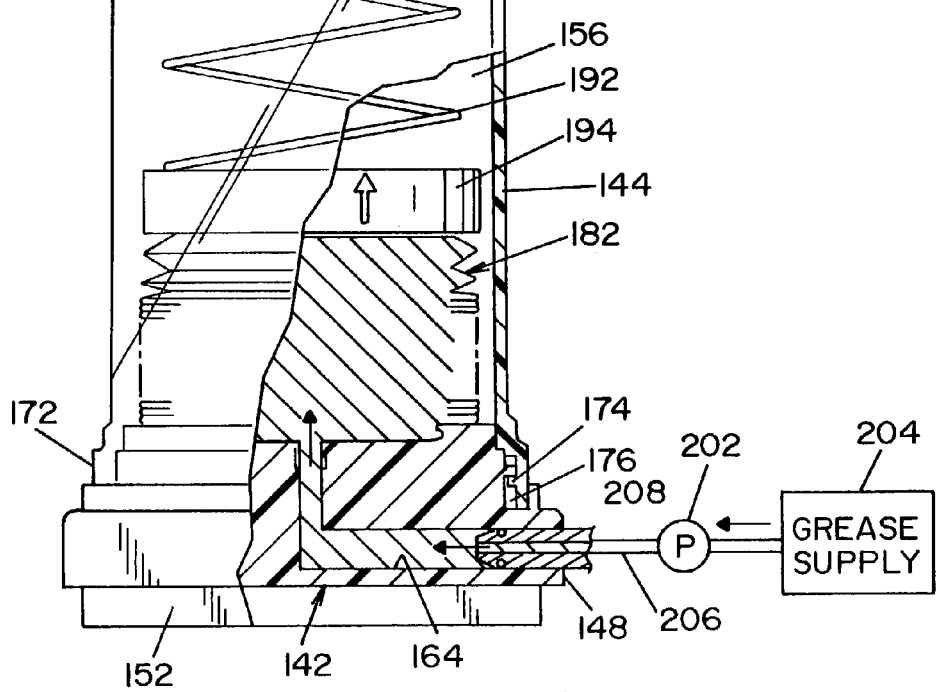

Referring now to FIGS. 13A and 13B, a method of refilling grease cartridge 182 is shown. In the embodiment shown, a positive displacement pump 202, such as a piston pump, is provided to pump grease from a reservoir 204 through a line 206 to a male connector 208. Male connector 208 is dimensioned to be connected into port 166 on base 142 of grease cartridge assembly 140. Because a bellows-type grease cartridge 182 is used, the bellows grease cartridge 182 collapses as grease is used. FIG. 13A is a grease cartridge assembly 140, wherein grease cartridge 182 is empty of grease, and is collapsed as a result of force exerted thereon by spring 192 and plate 194. To refill grease cartridge 182, grease need only be pumped into bellows grease cartridge 182, as illustrated schematically in FIG. 13B. Grease cartridge 182 will re-inflate as grease is forced therein. Since air is not introduced into grease cartridge 182 during its use, i.e., grease cartridge 182 collapses as the grease is dispensed therefrom, refilling of grease cartridge 182 merely requires grease be pumped into grease cartridge 182 to re-inflate the same.

The present invention thus provides a lubrication system 10 having a convenient and rapid way of refilling grease cartridge assembly 140, and provides a system, wherein grease cartridge assembly 140 may simply be replaced in a vehicle 12 without costly and significant downtime of vehicle 12.

Since metered amounts of grease are dispensed during each grease dispensing cycle, and the amount of grease contained within grease cartridge 182 can be determined, microprocessor 122 can be programmed to count the number of dispensing cycles and to provide an indication to a vehicle operator when the amount of grease left within grease cartridge 182 is low, thereby prompting replacement of the spent grease cartridge assembly 140 with a new, fully loaded grease cartridge assembly 140.

Figure 15:
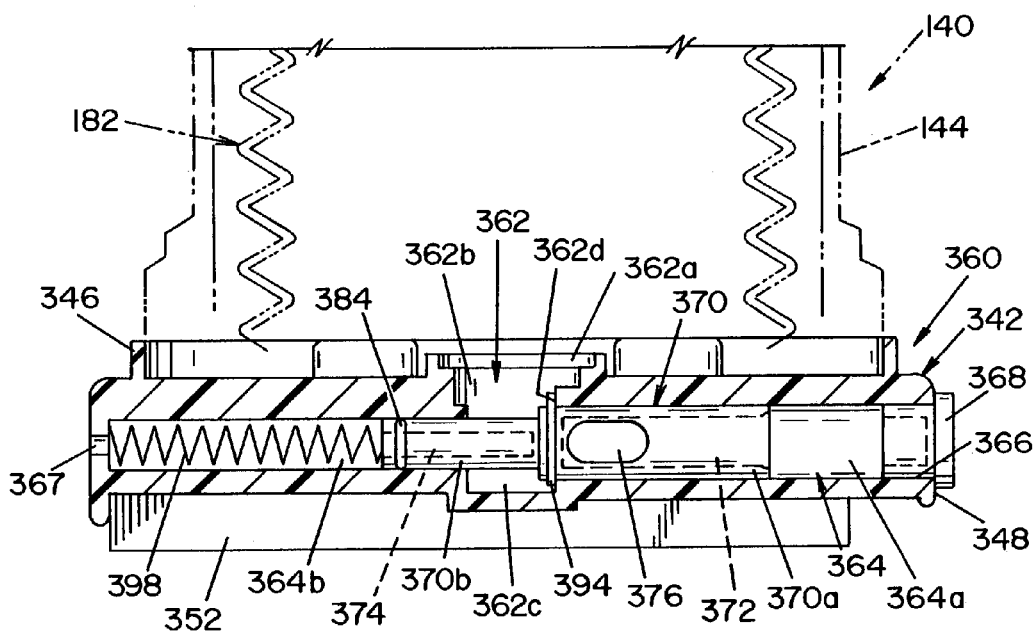
FIG. 15 is a sectional view of a base section for a container having a flow control assembly, illustrating another aspect of the present invention.

Referring now to FIG. 15, a grease flow control assembly 360 for controlling flow of grease from grease cartridge 182 is shown. Grease flow control assembly 360 includes a base section 342. Base section 342 is dimensioned for use with cap 144 and grease cartridge 182, as heretofore described. Base section 342 is basically a flat, planar component having a cylindrical boss 346 on the upper surface thereof Base section 342 has a semi-cylindrical edge surface 348 (like edge surface 148 of base section 142) dimensioned to mate with inner surface 22a of cavity 26 of housing 20. The lower surface of base 342 includes guide means to operatively interact with track 32 on housing 20 to guide and to position laterally grease cartridge assembly 140 within cavity 26 of housing 20. In the embodiment shown, the guide means are in the form of spaced apart, parallel rails 352 that extend from the bottom of base 342. Rails 352 are provided to run along the sides of the track or guide 32 within cavity 26 of housing 20. A bore 362 is formed within the surface of boss 346. In the embodiment shown, bore 362 is comprised of three bore sections 362a, 362b and 362c. Bore section 362c has a planar side wall 362d, best seen in FIG. 18. Bore 362 communicates with a passage 364 that extends through base 342. Passage 364 has a first passage section 364a and a second passage section 364b. Passage sections 364a, 364b are cylindrical in shape and coaxially aligned. First passage section 364a is larger in diameter than second passage section 364b and defines a port 366 along edge surface 348, as best seen in FIG. 17. Port 366 is dimensioned to matingly engage male fitting 94 on pump body 76. A plug 368 (shown in FIG. 15) is provided to be inserted within port 366 when grease cartridge assembly 140 is not in use in housing 20. An opening 367 is formed through base section 342 to communicate with passage section 364b.

Figure 16:
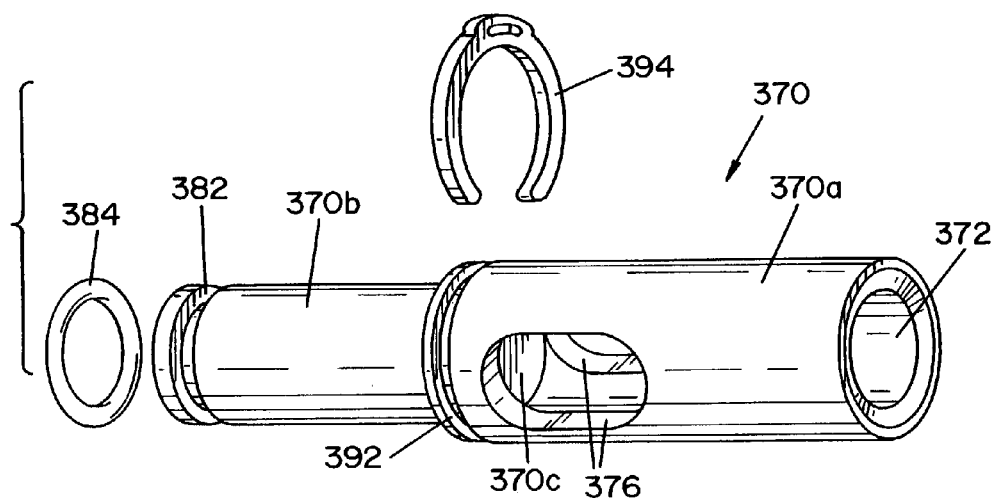
FIG. 16 is an exploded, perspective view of a shuttle valve for the flow control assembly of FIG. 15.

A shuttle valve 370 is disposed within passage 364. Shuttle valve 370, best seen in FIG. 16, is cylindrical in shape and has a first cylindrical body section 370a and a second cylindrical body section 370b. First body section 370a is dimensioned to be slidingly received in first passage section 364a, and second body section 370b is dimensioned to be slidingly received in passage section 364b. Shuttle valve body sections 370a, 370b are tubular in shape and define inner cavities 372, 374 respectively. Shuttle valve body sections 370a, 370b are open at the free ends thereof, wherein cavities 372, 374 extend through body sections 370a, 370b and communicate with the open ends thereof, as shown in FIGS. 15, 17 and 18. A wall 370c separates cavity 372 from cavity 374, such that cavities 372, 374 do not communicate with each other. Openings 376 are formed in shuttle valve body section 370a to communicate with cavity 372. An annular groove 382 is formed near the free end of body section 370b. Annular groove 382 is dimensioned to receive an O-ring 384, to form a sliding seal between shuttle valve body section 370b and passage section 364b. An annular groove 392 is formed in shuttle valve body section 370a, near the junction where body section 370a and body section 370b meet, as best seen in FIG. 16. Annular groove 392 is dimensioned to receive a retaining ring 394. Retaining ring 394 is attached to shuttle valve body 370 after shuttle valve body 370 has been inserted in passageway 364 through port 366. Retaining ring 394 is inserted into annular groove 392 through bore 362. As shown in the drawings, a biasing element 398 is disposed within passage section 364b between base section 342 and shuttle valve 370. In the embodiment shown, biasing element 398 is a helical spring.

Referring now to the operation of grease flow control assembly 360, shuttle valve body 370 acts as a flow control device to prevent the flow of grease from a grease cartridge 182 when grease cartridge assembly 140 is not in use, i.e., not attached, to housing 20. As indicated above, grease flow control assembly 360, i.e., base section 342 and shuttle valve body 370, are adapted for use as part of a grease cartridge assembly 140, i.e., base section 342 and shuttle valve 370 are used in conjunction with cap 144 and grease cartridge 182. When grease cartridge assembly 140, having a grease flow control assembly 360 as part thereof, is not in use, i.e., connected, with housing 20, shuttle valve 370 has a first position, as seen in FIG. 17. In this position, biasing element 392 biases shuttle valve 370 to the position shown wherein retaining ring 394 abuts planar surface 362d. In this position, shuttle valve section 370b is disposed within bore 362. Since there are no openings in shuttle valve section 370b, the grease in cartridge 182 is prevented from flowing therefrom. With shuttle valve 370 in this first position, grease cartridge assembly 140 may be stored and/or shipped without concern of grease flowing therefrom.

When grease cartridge assembly 140 is to be used in housing assembly 20, plug 368 is removed from port 366, and grease cartridge assembly 140 is inserted into housing 20, as previously described. In this respect, guide rails 352 on base 342 interact with track 32 on housing 20 to locate laterally grease cartridge assembly 140 within housing 20. Horizontal shelves 33 are disposed on housing 20 to slide across the upper surface of base 342, to maintain grease cartridge assembly 140 in a proper vertical position within housing 20. Guide rail 352 and track 32 align port 366 in base 342 with male fitting 94 extending from pump body 76. Semi-cylindrical edge surface 348 of base 342 abuts semi-cylindrical surface 22a of housing 20 to insure proper positioning aligning of male fitting 94 within port 366. As male fitting 94 is inserted into passage section 364a, male fitting 94 engages shuttle valve section 370a and moves shuttle valve 370 toward biasing element 398. When base section 342 is in position against inner housing wall surface 22a, male fitting 94 has forced shuttle valve 370 into a second position, as shown in FIG. 18. In this position, openings 376 in shuttle valve section 370a are disposed within bore section 362c. In this position, grease within grease canister 182 can flow through openings 376 in shuttle valve section 370a into cavity 372, and from cavity 372 into the passageway in male fitting 94, as illustrated by arrows in FIG. 18. Grease flow control assembly 360 thus prevents the flow of grease from grease cartridge assembly 140, when grease cartridge assembly 140 is not in use in housing 20 of lubrication system 10.

As will be appreciated by those skilled in the art, shuttle valve 370 operates in a similar fashion during refilling of grease cartridge 182. In like manner, male connector 208 of the refilling system (shown in FIG. 13B) would shift shuttle valve 370 to its second position to allow grease to be forced into grease cartridge 182 during a filling operation. When grease canister 182 is filled and base section 342 is removed from male connector 208, shuttle valve 370 would return to its first position under influence of biasing device 398, thereby preventing grease within grease cartridge 182 from being forced thereout.

Figure 19:
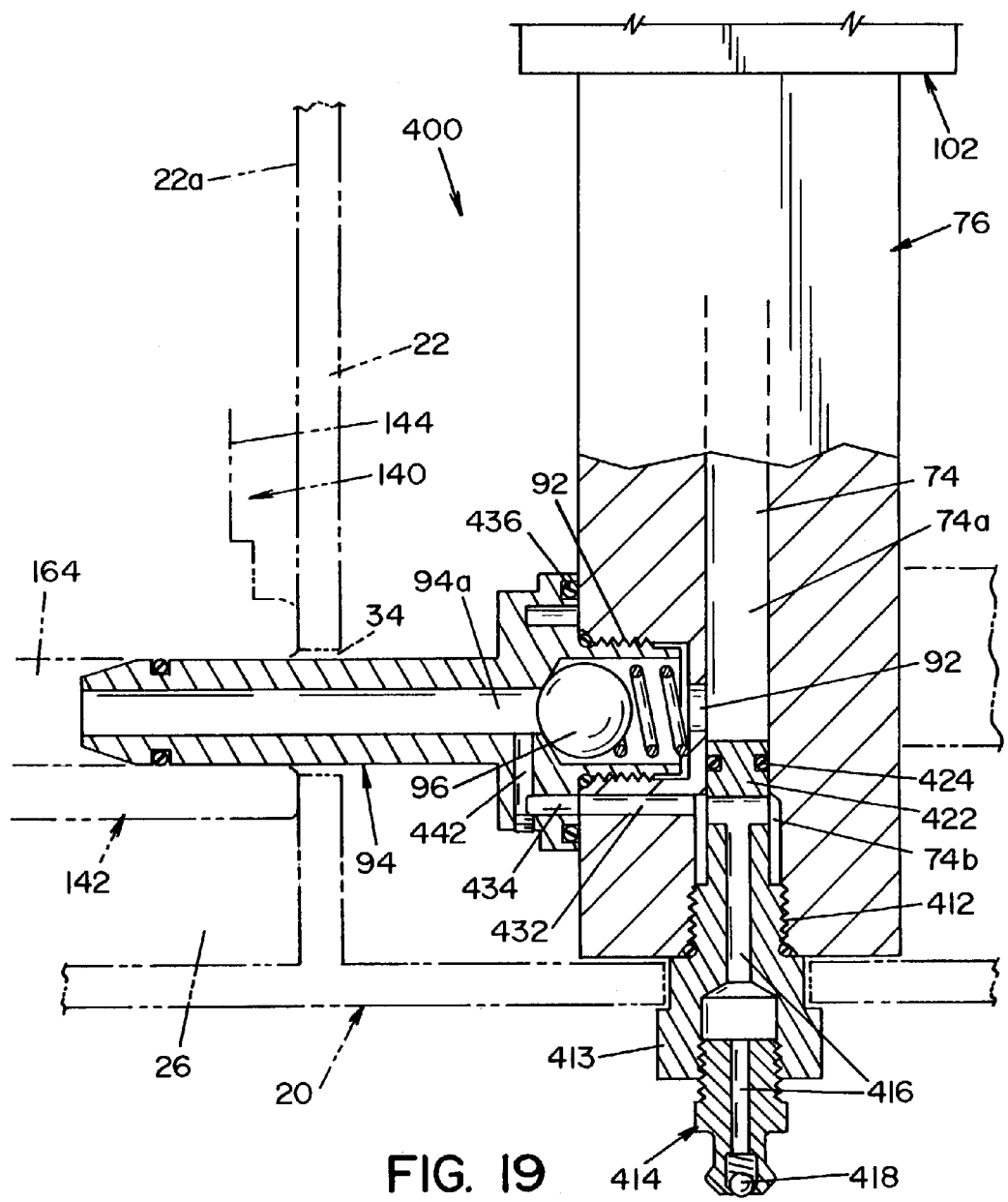
FIG. 19 is a sectional view of the lower portion of a lubricant pump/dispenser assembly, illustrating an alternate embodiment of the present invention.

Referring now to FIG. 19, a pump/dispenser assembly 400 illustrating an alternate embodiment of the present invention is shown. Pump/dispenser assembly 400 is basically similar to pump/dispenser assembly 50 as heretofore described. In the embodiment shown in FIG. 19, only a lower portion of pump/dispenser assembly 400 is shown, it being understood that the upper portion of pump/dispenser assembly 400 is the same as the upper portion of pump/dispenser assembly 50.

As in pump/dispenser assembly 50, pump/dispenser assembly 400 has a pump body 76. Pump body 76 includes an inlet port 92 that extends from the outer surface of pump body 76 into pump cavity 74. Inlet port 92 is threaded to receive an outwardly projecting male fitting 94. Male fitting 94 is dimensioned to extend through opening 34 in wall 22 into cavity 26, when pump/dispensing 400 is mounted to housing 20, in a manner as shown in FIG. 6. As previously described, fitting 94 is adapted to connect to grease cartridge assembly 140 (as described above) to provide a source of grease to pump cavity 74. Male fitting 94 includes a directional check valve 96.

In the embodiment shown in FIG. 19, pump cavity 74 extends through pump body 76 to define an opening 412 at the end of pump body 76. Opening 412 is dimensioned to receive a conventional grease fitting 414. In a preferred embodiment, opening 412 is threaded to receive a bushing 413 that in turn receives a threaded grease fitting 414. An internal channel 416 is defined through bushing 413 and grease fitting 414. A directional check valve 418 is disposed within channel 416. Check valve 418 is operable to allow lubricant flow into pump body 76, but to prevent flow therefrom.

A barrier element 422 is disposed within pump cavity 74 to isolate fitting 414 from pump piston 72. A seal 424 is disposed between the outer surface of barrier element 422 and the inner surface of pump cavity 74 to form a fluid-tight seal therebetween. Barrier element 422 divides pump cavity 74 into a first section 74*a* that is adjacent pump piston 72 and a second section 74*b* that is adjacent to opening 412. As shown in FIG. 19, barrier element 422 is disposed below inlet port 92 such that inlet port 92 communicates with first section 74*a* of pump cavity 74.

An aperture 432 extends through pump body 76. Aperture 432 connects at one end with second section 74*b* of pump cavity 74 and at the other end with an annular groove 434 formed in the base portion of male fitting 94. A seal 436 is disposed between the base portion of male fitting 94 and pump body 76, such that annular groove 434 defines a sealed chamber. An opening 442 in male fitting 94 connects annular groove 434 with the inner passage 94*a* that is defined by male fitting 94. A lubricant path is thus formed between fitting 414 and male fitting 94 through channel 416, aperture 432, annular groove 434 and opening 442.

Pump/dispensing assembly 400 shown in FIG. 19 allows for refilling of collapsible grease cartridge 182 while grease cartridge assembly 140 is attached to pump/dispensing assembly 400. In this respect, a mating connection on a source of grease can be attached to grease fitting 414. Grease is forced through channel 416 in fitting 414 and through aperture 432 and annular groove 434 into passage 94*a* within male fitting 94. Grease then flows through passage 164 in base 142 into collapsible grease cartridge 182. The embodiment shown in FIG. 19 thus allows refilling of grease cartridge 182 without removal of grease cartridge assembly 140 from housing 20.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. An automatic lubrication system for a vehicle, comprising:
   a pump assembly having a plurality of outlet ports and a lubricant inlet port;
   a motor operable to drive said pump assembly;
   a cartridge assembly that is attachable to said pump assembly at said lubricant inlet port to provide a source of lubricant to said pump, said cartridge assembly being removable from said pump assembly, said cartridge assembly having a base, a cover that is attachable to the base to define a cavity, and a lubricant cartridge within said cavity, said base having a passage therethrough and said lubricant cartridge having an interior space that is collapsible as lubricant is dispensed therefrom, said interior space being in fluid communication with said passage in said base, said base being attachable to said lubricant inlet port;
   a valve within said passage, said valve being movable to control the flow of lubricant through said passage, said valve being movable when said base is attached to said inlet port;
   a controller operable to periodically initiate said motor to cause said pump to dispense lubricant to said outlet ports; and
   a housing having a first housing section attachable to said vehicle and a removable cover attachable to said first housing section, wherein said pump assembly, said motor assembly and said cartridge assembly are contained within said first housing section and said removable cover.

2. An automatic lubrication system as defined in claim 1, wherein said pump, motor and controller are mounted to said first housing section.

3. An automatic lubrication system as defined in claim 1, wherein said pump is a piston pump.

4. An automatic lubrication system as defined in claim 3, wherein said motor is a reversible motor.

5. An automatic lubrication system as defined in claim 1, wherein said lubricant cartridge includes a collapsible bellow for holding said lubricant.

6. A lubrication system for a vehicle, comprising:
   a lubrication dispensing assembly having a lubricant inlet fitting and a plurality of outlet ports that are connectible to locations on said vehicle;
   a controller operable to periodically activate said lubrication dispensing assembly to dispense metered amounts of lubricant to said outlet ports;
   a replaceable lubricant cartridge having an interior cavity for storing lubricant under pressure, said cartridge having a base having a passage therethrough that is attachable to said dispensing assembly, said cartridge being attachable to said base and having valve means operable to allow flow of lubricant to said dispensing assembly when said cartridge is attached to said dispensing assembly and to prevent flow of lubricant to said dispensing assembly when said cartridge is detached from said dispensing assembly; and an opening through said dispensing assembly, said opening being disposed to be in conmiunication with said passage in said base to allow filling or refilling of said cartridge when said cartridge is attached to said dispensing assembly.

7. A lubrication system as defined in claim 6, further comprising a housing dimensioned to contain said lubrication dispensing assembly, said controller and said replaceable lubricant cartridge.

8. A lubrication system as defined in claim 6, wherein said lubrication dispensing assembly is comprised of a pump and a motor operable to drive said pump.

9. A lubrication system as defined in claim 8, wherein said pump is a piston pump and said motor is a reversible motor.

10. A lubrication system as defined in claim 6, wherein said lubricant cartridge is comprised of collapsible bellows having a collapsible internal chamber for holding said lubricant, said internal chamber being in communication with said passage.

11. A lubrication system as defined in claim 10, further comprising a cover releaseably attachable to said base, said cover dimensioned to encase said collapsible bellows.

12. A lubrication system as defined in claim 11, further comprising a biasing element disposed between said cover and said bellow to bias said bellow towards a collapsed position.

13. A lubrication system as defined in claim 6, wherein said valve means includes a valve element disposed within said passage, said valve element being movable between a first position, wherein lubricant is prevented from flowing through said passage and a second position wherein lubricant is permitted to flow through said passage.

14. A lubrication system as defined in claim 13, wherein said valve element is movable from said first position to said second position by surface means on said dispensing assembly when said cartridge is attached to said dispensing assembly.

15. A lubricant cartridge for connection to a pump assembly in a lubrication system, comprising:

a base having a passage therethrough, said passage having a first end and a second end connectable to a pump assembly of said lubrication system;

a collapsible cartridge having a collapsible inner chamber for storing a lubricant, said cartridge being mountable on said base with said inner chamber in communication with said first end of said passage;

a biasing element biasing said cartridge toward a collapsed configuration, wherein said lubricant within said inner chamber is forced into said passage; and a flow control assembly in said passage for controlling the flow of said lubricant through said passage, said lubricant flow control assembly comprised of a valve having an opening therein, said valve being movable in said passage between a first position wherein said opening is obstructed and said lubricant is prevented from flowing through said passage, and a second position wherein said opening connects said first end of said passage to said second end of said passage and said lubricant is allowed to flow through said passage to said second end thereof, said valve being movable to said first position by removal of said cartridge from said lubrication system and being movable to said second position by attachment of said cartridge to said lubrication system, said valve remaining in said second position while said cartridge is attached to said lubrication system.

16. A cartridge as defined in claim 15, further comprising a cover releaseably attachable to said base, said cover dimensioned to encase said cartridge between said base and said cover.

17. A cartridge as defined in claim 16, wherein said cover is formed of a clear, polymeric material.

18. A cartridge as defined in claim 16, wherein said biasing element is a spring disposed between said cover and said cartridge.

19. A cartridge as defined in claim 18, wherein a plate is disposed between said spring and said cartridge.

20. A cartridge as defined in claim 15, wherein said cartridge is a generally cylindrical collapsible bellow.

21. A cartridge as defined in claim 20, wherein said bellow is formed of a resilient, polymeric material.

* * * * *